(12) United States Patent
Riordan et al.

(10) Patent No.: US 7,689,786 B1
(45) Date of Patent: Mar. 30, 2010

(54) TECHNIQUES FOR OVERRIDING DEVICE RESERVATIONS

(75) Inventors: Patrick Brian Riordan, Watertown, MA (US); Arieh Don, Newton, MA (US); Michael E. Bappe, Loveland, CO (US); Helen S. Raizen, Jamaica Plain, MA (US); Michael J. Scharland, Franklin, MA (US); David Joshua Brown, Chelmsford, MA (US)

(73) Assignee: EMC Corporation, Hopkinton, MA (US)

( * ) Notice: Subject to any disclaimer, the term of this patent is extended or adjusted under 35 U.S.C. 154(b) by 710 days.

(21) Appl. No.: 11/540,018

(22) Filed: Sep. 29, 2006

(51) Int. Cl.
*G06F 13/00* (2006.01)
(52) U.S. Cl. .................. 711/154; 711/114; 711/210; 712/216
(58) Field of Classification Search .................. 711/154
See application file for complete search history.

(56) References Cited

U.S. PATENT DOCUMENTS

| | | | |
|---|---|---|---|
| 4,207,609 A | 6/1980 | Luiz et al. | |
| 5,206,939 A | 4/1993 | Yanai et al. | |
| 5,778,394 A | 7/1998 | Galtzur et al. | |
| 5,845,147 A | 12/1998 | Vishlitzky | |
| 5,857,208 A | 1/1999 | Ofek | |
| 6,704,810 B1 | 3/2004 | Krehbiel, Jr. et al. | |
| 7,277,952 B2 * | 10/2007 | Nishanov et al. | 709/229 |
| 2004/0215780 A1 * | 10/2004 | Kawato | 709/226 |
| 2005/0033888 A1 * | 2/2005 | Qi | 710/200 |
| 2007/0260916 A1 * | 11/2007 | Nguyen et al. | 714/13 |

OTHER PUBLICATIONS

Monia, Charles, "Information technology—SCSI-3 Architecture Model", Working Draft SCSI-3 Architecture Model, ASC X3T10/994D revision 18, Nov. 27, 1995, pp. 1-73.
"dpANS SCSI-3 Primary Commands (SPC)", American National Standard for Information Systems—Information Technology—SCSI-3 Primary Commands (SPC), Mar. 28, 1997, pp. 1-167.
U.S. Appl. No. 10/879,383, Halligan, et al.
U.S. Appl. No. 11/014,597, Brown, et al.

* cited by examiner

*Primary Examiner*—Hetul Patel
(74) *Attorney, Agent, or Firm*—Muirhead and Saturnelli, LLC

(57) ABSTRACT

Described are techniques for overriding an existing device reservation. Discovery processing is performed by a first data storage system to locate a specified device. The discovery processing includes determining whether there is a reservation conflict for said device of a second data storage system. If there is a reservation conflict for the device, a command is issued from the first data storage system to the second data storage system during said discovery processing to create an override for said reservation conflict. The override causes processing to be performed at a subsequent point in time so that an existing reservation associated with the reservation conflict is overridden in connection with performing a first process on said first data storage system.

20 Claims, 19 Drawing Sheets

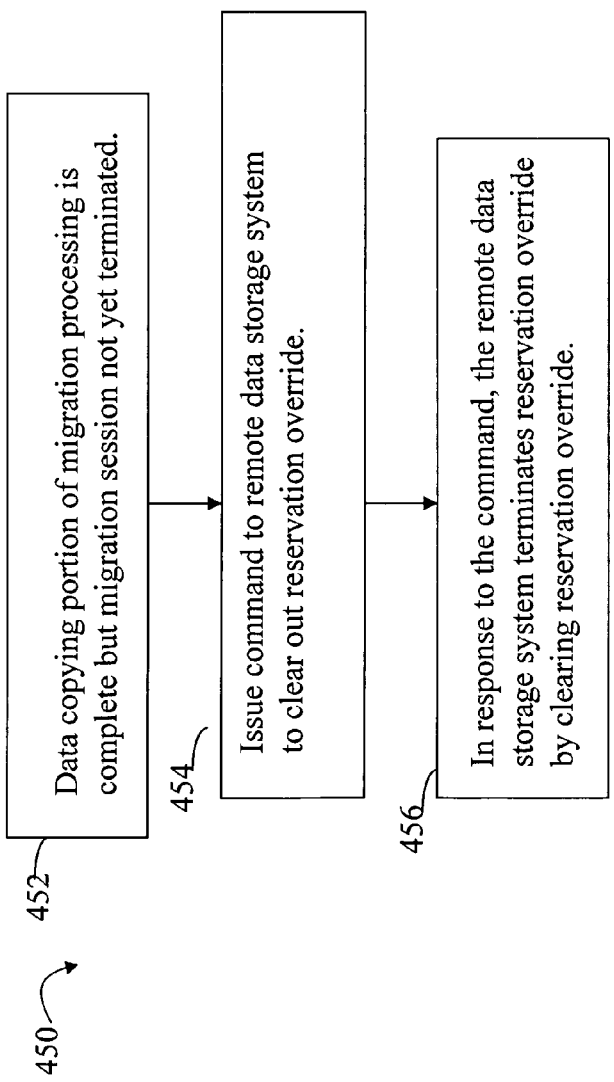

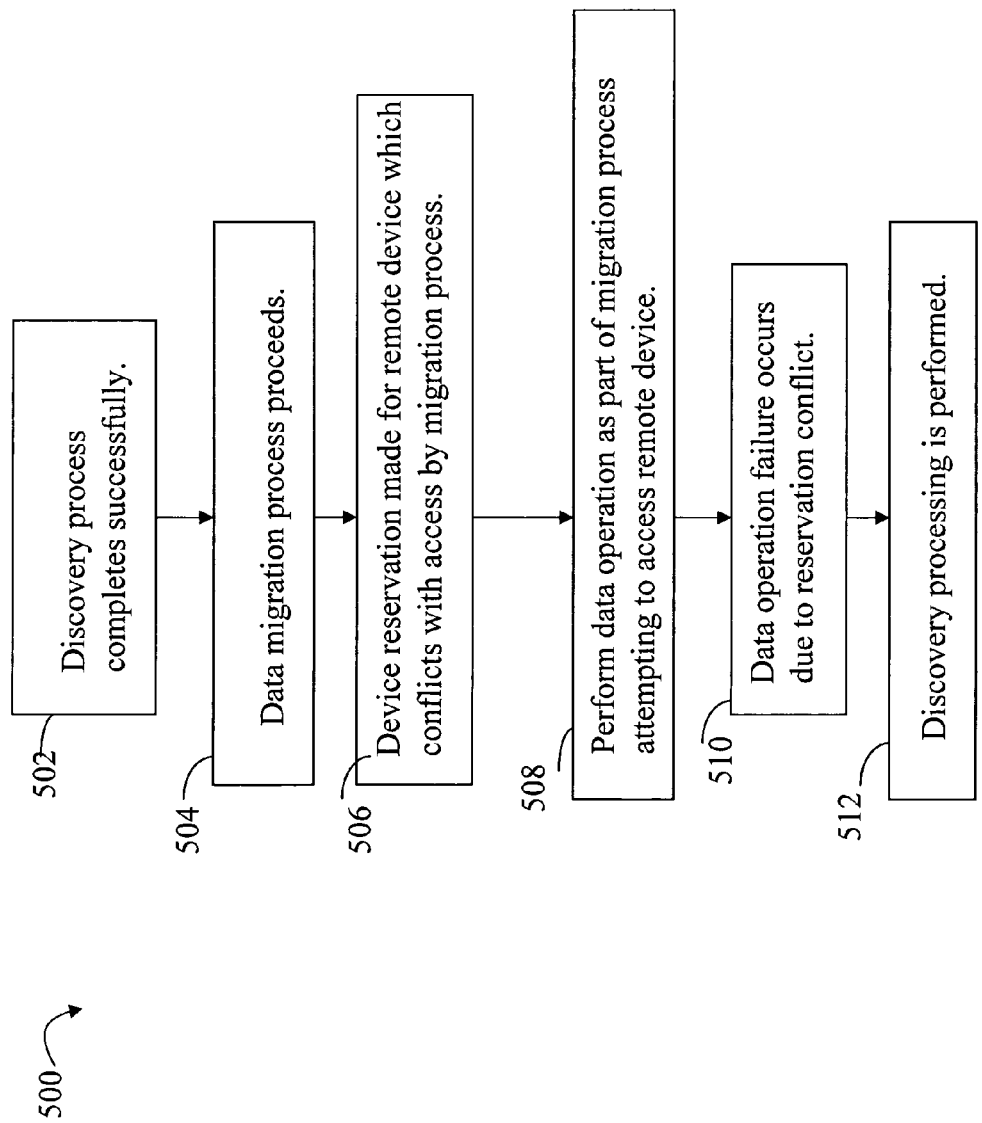

TECHNIQUES FOR OVERRIDING DEVICE RESERVATIONS

BACKGROUND

1. Technical Field

This application generally relates to data storage, and more particularly to techniques used in connection with device reservations.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

In connection with devices used by a host, a host may make a device reservation. Device reservations, for example, as referenced in connection with the Small Computer Systems Interface (SCSI) standard, are used in connection with storage devices for allowing only certain users or computers to execute commands to the devices. For example, a reservation may allow only certain users, also referred to as an initiator port or host, to read or write to a volume on a device on a per path basis. In some cases, a host may be given exclusive permission to write to a volume while one or more other hosts may be given permission to read, but not write, to the volume. As known in the art, the SCSI standard may be characterized as a collection of standards managed by the T10 technical committee as described, for example, at the internet website associated with this committee. The device reservation feature is described, for example, in the SCSI-3 Architectural Model (SAM) available through the foregoing website.

A problem may occur when an existing reservation is not needed or is not otherwise in use, and another host wishes to access the reserved device. The existing reservation may be, for example, an old reservation that was not removed or released. The existing reservation for a device may also be a valid reservation, such as one applicable in connection with ongoing processing of a first host, and a second host may also need to access the device in connection with processing on the second host. The existing reservation may cause problems for subsequent hosts, such as the second host, trying to access the device by causing a reservation conflict. The reservation conflict may cause processing performed on the subsequent hosts to fail when attempting to access the reserved device.

Some existing reservations may be cleared, for example, by resetting or powering down the device, or with user action by issuing a command to clear an existing reservation. It may also be undesirable or impractical to reset or power down a device, or have explicit user intervention by issuing a command to clear the reservation. Additionally, there may be various types of reservations. In some implementations, there may be a reservation that can survive a reset and/or power down.

Accordingly, it may be desirable and advantageous to utilize a technique for overriding an existing reservation without having to reset and/or power down the device, or otherwise having explicit user intervention to clear the reservation, such as by issuing a command.

SUMMARY OF THE INVENTION

In accordance with one aspect of the invention is a method for overriding an existing device reservation comprising: performing discovery processing by a first data storage system to locate a specified device, said discovery processing including determining whether there is a reservation conflict for said device of a second data storage system; and if there is a reservation conflict for said device, issuing a command from the first data storage system to the second data storage system during said discovery processing to create an override for said reservation conflict, said override causing processing to be performed at a subsequent point in time so that an existing reservation associated with the reservation conflict is overridden in connection with performing a first process on said first data storage system. There may be a reservation conflict for said device as determined during said discovery processing, and the method may also include: receiving, by said second data storage system, a request from said first process executing on the first data storage system, said request including a data operation initiated by the first process to access data on the device; and performing, by said second data storage system, said data operation initiated by the first process for accessing data on the device, said data operation being performed in accordance with said override and causing an existing device reservation associated with said reservation conflict to be overridden. The performing may be done for the duration of the first process. The discovery processing may be performed prior to commencing processing for said first process. The first process may be a migration process migrating data from said device of said second data storage system to another device of said first data storage system. The method may also include: issuing an inquiry command to the second data storage system to determine a type of said second data storage system; determining, in accordance with said type of the second data storage system, whether said second data storage system supports reservation override processing; and only issuing said command to create an override if said second data storage system supports reservation override processing. The command may be a proprietary command that includes an identifier uniquely identifying a type of process on the first data storage system. If the second data storage system does not support reservation override processing, the method may also include performing processing to join an existing device reservation group for said device. The migration process may only reads data from said device and copies said data to said other device. The migration process may migrate a portion of data to said other device from said device in response to receiving a request at said first data storage system using said portion of data. The migration process may read data from said device, copy the data to said other device in connection with a data operation, update a copy of said data on said other device; and write out an updated copy of the data to said device. The step of writing out said updated copy of the data to the device may be conditionally performed in accordance with a value of a parameter. The step of issuing a command from the first data storage system to the second data storage system to create an override for said reservation conflict by said first data storage system in connection with performing a first process may be conditionally performed in accordance with a value of a parameter. The discovery processing may be performed after commencing processing for said first process in response to an error in connection with performing a data operation for said device. The method may also include: performing said discovery processing a first time in which no reservation conflicts for said device are determined; performing processing for said first process, said processing including performing a data operation for said device; determining an error in connection with performing said data operation; and performing said discovery processing a second time in which a reservation conflict for said device is determined. The method may also include clearing an existing override to override said device reservation upon termination of said first process.

In accordance with another aspect of the invention is a method for overriding an existing device reservation comprising: determining, by a first initiator, whether there is a reservation conflict for a device of a remote data storage system; and if there is a reservation conflict for said device, issuing a command by the first initiator to the remote data storage system to create an override for said reservation conflict, said command being issued by said first initiator on a path from said initiator to said remote data storage system, said override allowing said initiator to proceed with subsequent data operations to said device sent using said path from said initiator to said remote data storage system. The method may also include detecting an error when performing processing by said initiator in connection with an operation for said device, and wherein said determining and said issuing said command are performed in response to said detecting. The first initiator may be one of a data storage system, a host, an appliance and a switch in a network.

In accordance with yet another aspect of the invention is a computer readable medium comprising code stored thereon for overriding an existing device reservation, the computer readable medium comprising code that: determines, by a first initiator, whether there is a reservation conflict for a device of a remote data storage system; and if there is a reservation conflict for said device, issues a command by the first initiator to the remote data storage system to create an override for said reservation conflict, said command being issued by said first initiator on a path from said initiator to said remote data storage system, said override allowing said initiator to proceed with subsequent data operations to said device sent using said path from said initiator to said remote data storage system.

BRIEF DESCRIPTION OF THE DRAWINGS

Features and advantages of the present invention will become more apparent from the following detailed description of exemplary embodiments thereof taken in conjunction with the accompanying drawings in which:

FIGS. 8 and 9 are flowcharts of processing steps for various embodiments to terminate or clear an existing reservation override;

FIG. 11 is a flowchart of processing steps that may be performed in an embodiment using the techniques herein in connection with another way in which a device reservation conflict may be determined;

DETAILED DESCRIPTION OF EMBODIMENT(S)

Figure 1:
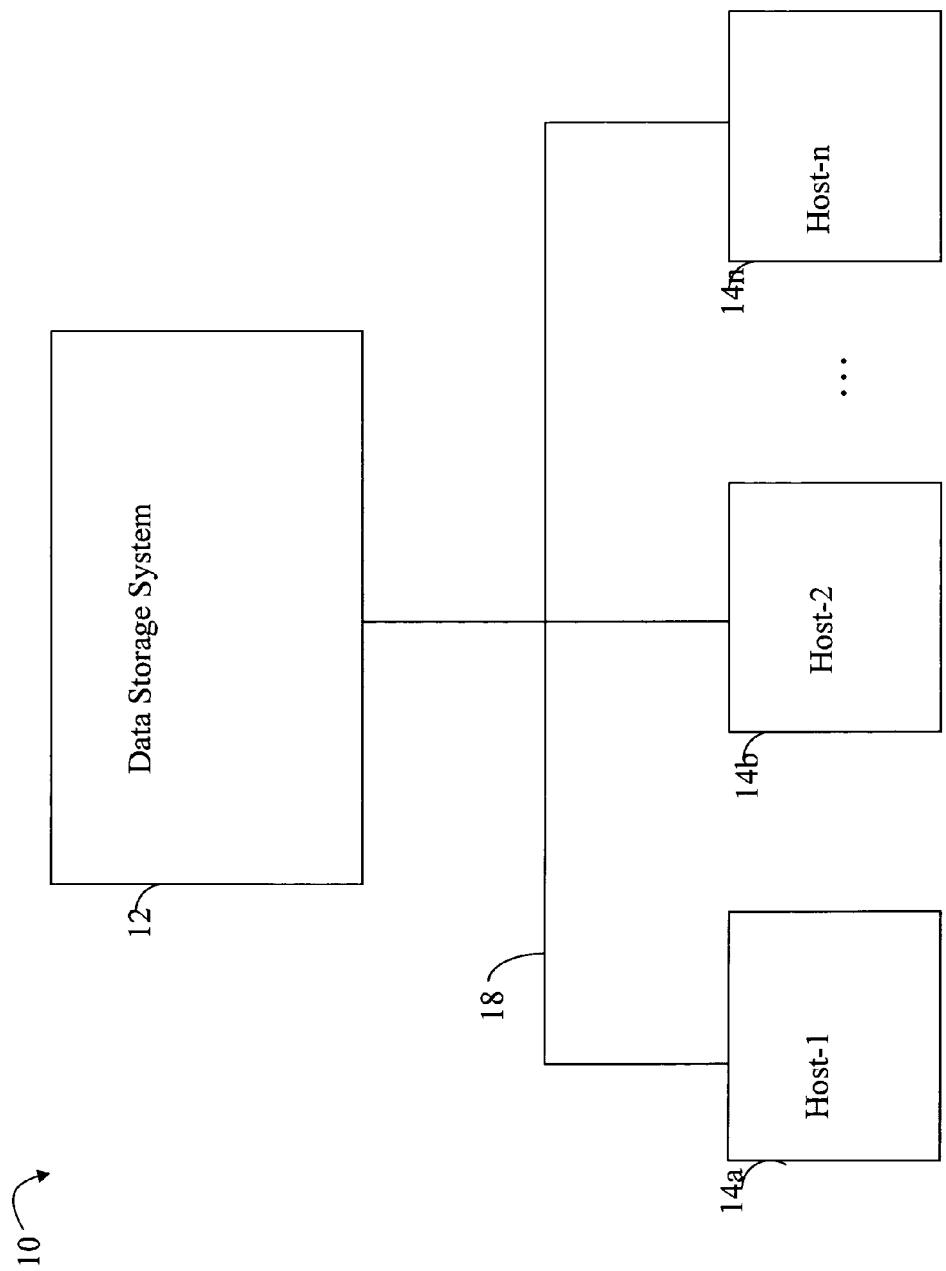
FIG. 1 is an example of an embodiment of a computer system that may utilize the techniques described herein.

Referring now to FIG. 1, shown is an example of an embodiment of a computer system that may be used in performing the techniques described herein. The computer system 10 includes a data storage system 12 connected to host systems 14a-14n through communication medium 18. In this embodiment of the computer system 10 and the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and may also communicate with others included in the computer system 10.

Each of the host systems 14a-14n and the data storage system 12 included in the computer system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site; or, alternatively, may also be located in different physical locations. Examples of the communication medium that may be used to provide the different types of connections between the host computer systems and the data storage system of the computer system 10 may use a variety of different communication protocols such as SCSI, Fibre Channel, or iSCSI, and the like. Some or all of the connections by which the hosts and data storage system 12 may be connected to the communication medium 18 may pass through other communication devices, such as a Connectrix or other switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

Figure 2A:
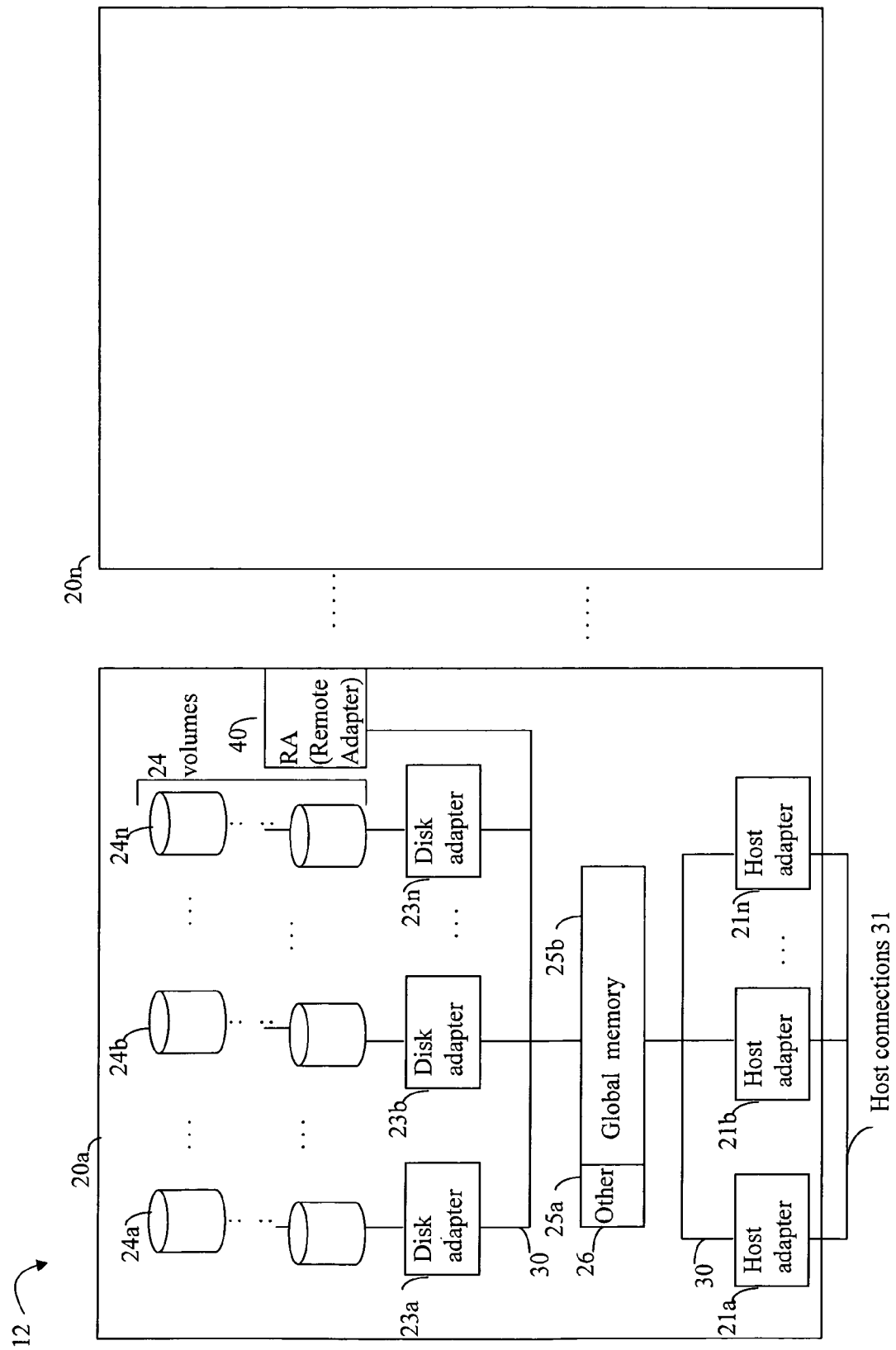
FIG. 2A is an example of an embodiment of a data storage system.

Referring now to FIG. 2A, shown is an example of an embodiment of the data storage system 12 that may be included in the computer system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the computer system 10 of FIG. 1 to provide storage services to, for example, host computer systems. It should be noted that the data storage system 12 may operate stand-alone, or may also included as part of a storage area network (SAN) that includes, for example, other components.

Each of the data storage systems, such as 20a, may include a plurality of disk devices or volumes, such as the arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the system 20a, a single DA, such as 23a, may be responsible for the management of a row of disks or volumes, such as row 24a.

The system 20a may also include one or more host adapters ("HAs") or directors 21a-21n. Each of these HAs may be used to manage communications and data operations between one or more host systems and the global memory. In an embodiment, the HA may be a Fibre Channel Adapter or other adapter which facilitates host communication.

One or more internal logical communication paths may exist between the DA's, the RA's, the HA's, and the memory 26. An embodiment, for example, may use one or more internal busses and/or communication modules. For example, the global memory portion 25b may be used to facilitate data transfers and other communications between the DA's, HA's and RA's in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in the storage system 20a is an RA or remote adapter 40. The RA may be hardware including a processor used to facilitate communication between data storage systems, such as between two of the same or different types of data storage systems.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LV(s) residing thereon.

The DA performs I/O operations on a disk drive. In the following description, data residing on an LV may be accessed by the DA following a data request in connection with I/O operations that other directors originate.

Figure 2B:
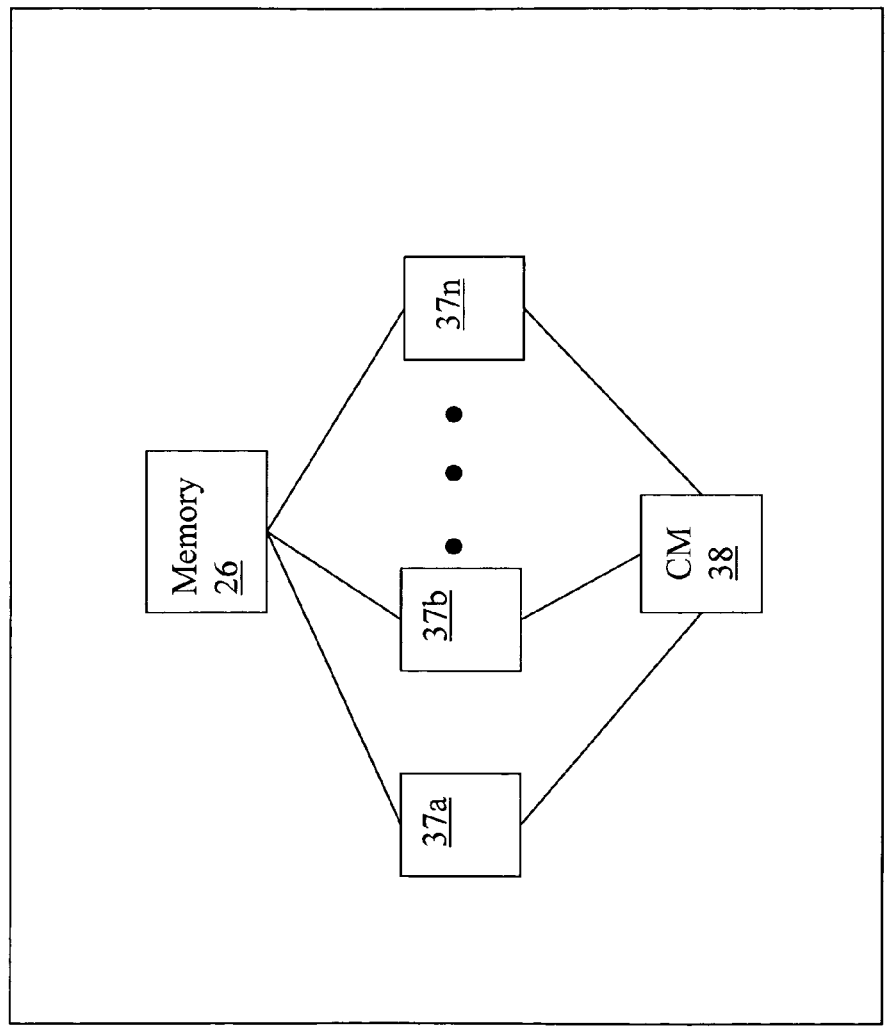
FIG. 2B is a representation of the logical internal communications between the directors and memory included in one embodiment of the data storage system of FIG. 2A.

Referring now to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HA's, RA's, or DA's that may be included in a data storage system. In an embodiment disclosed herein, there may be up to sixteen directors coupled to the memory 26. Other embodiments may use a higher or lower maximum number of directors that may vary.

The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

Figure 3:
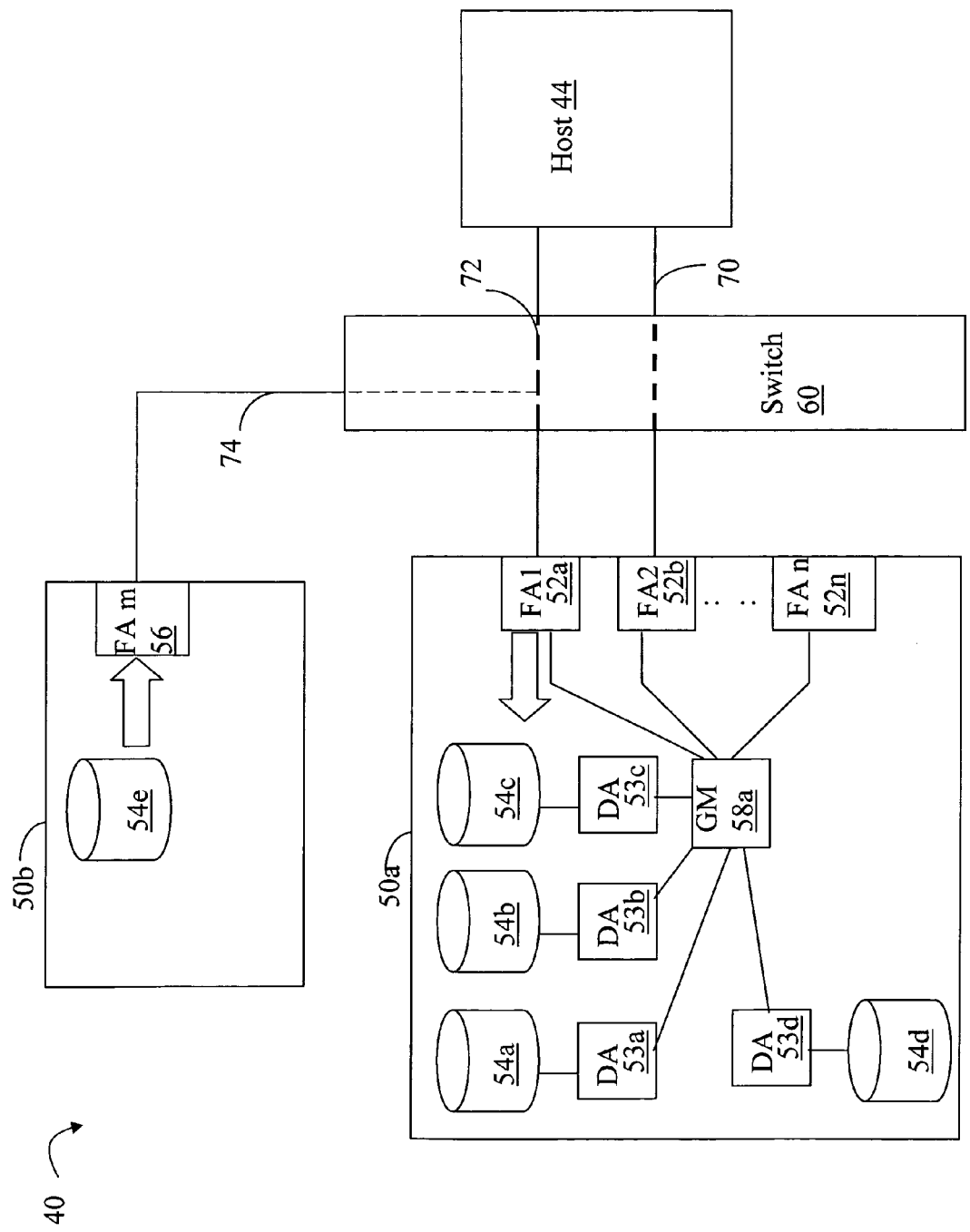
FIG. 3 is an example of an embodiment of a computer system that may utilize the techniques described herein with a data pull migration session.

Referring now to FIG. 3, shown is an example of an embodiment of a computer system 40 that may be used in connection with the techniques described herein. It should be noted that the embodiment illustrated in FIG. 3 presents a simplified view of some of the components of a computer system as generally illustrated in FIGS. 1 and 2A, for example, including only some detail of the data storage systems 50a and 50b for the sake of illustration.

Included in the system 40 are the data storage systems 50a and 50b, a switch 60 and host 44. The data storage system 50a and the host 44 may communicate using switch 60. In this example, the data storage system 50a includes data storage devices 54a-54d, DAs 53a-53d, global memory (GM) 58a, and multiple Fibre Channel Adapters (FAs) 52a-52n. Each of the FAs 52a-52n has a Fibre Channel connection to the switch 60 to facilitate communications with the host 44. For example, the host 44 may issue a command in the form of one or more messages to data storage system 50a through switch 60 over path 70 or 72 to one of the FAs 52a-52n. Similarly, the switch 60 may be used to communicate messages from the data storage system 50a to the host. In one embodiment, the switch 60 may be an 8 port switch although a switch used in connection with the techniques herein may include any number of ports.

In the example 40, the host may communicate with the data storage system 50a over one or more paths such as 70 and 72. Embodiments in which data operations can be communicated from one or more hosts to the data storage system over more than one path may be characterized as a multipath environment with respect to host-data storage system communications. In other words, multipathing allows for two or more data paths to the data storage system to be simultaneously used for read and/or write operations.

The switch 60 may also be used in connection with communications between the data storage system 50a and the data storage system 50b. It should be noted that additional details regarding data storage system 50b have been omitted for sake of simplicity and illustration but also includes DAs, GM, and the like, as included in the data storage system 50a. In this example, the data storage system 50b may include a Fibre Channel Adapter, FA m 56, and a storage device 54e.

In one embodiment as illustrated herein, the FA1 52a may be used in connection with migrating or copying data from data storage system 50b to 50a over connection 74. Any one of a variety of different techniques may be used in connection with migrating data from a device of 50b, such as device 54e, to a device of 50a, such as device 54c. In this example illustrated in FIG. 3, a technique referred to as a data pull migration technique is illustrated. With the data pull model, the system including the FA controlling the migration process functions as the target by pulling or copying data from another source system, such as 50b. It may also be the case that data is migrated in the reverse direction using a technique referred to as a data push migration technique. With the data push model, the system including the FA controlling the migration process functions as the source and pushes data to another data storage system. An example of techniques that may be used in connection with online data migration are described in U.S. patent application Ser. No. 10/879,383, filed on Jun. 29, 2004, ONLINE DATA MIGRATION, which is incorporated herein by reference. U.S. patent application Ser. No. 10/879,383 describes techniques for migration of data from a source to a target using the data pull and also the data push migration technique. The data pull migration is described in connection with the techniques herein for purposes of illustration although the techniques described herein may also be used in connection with a migration process utilizing the data push technique.

Figure 4:
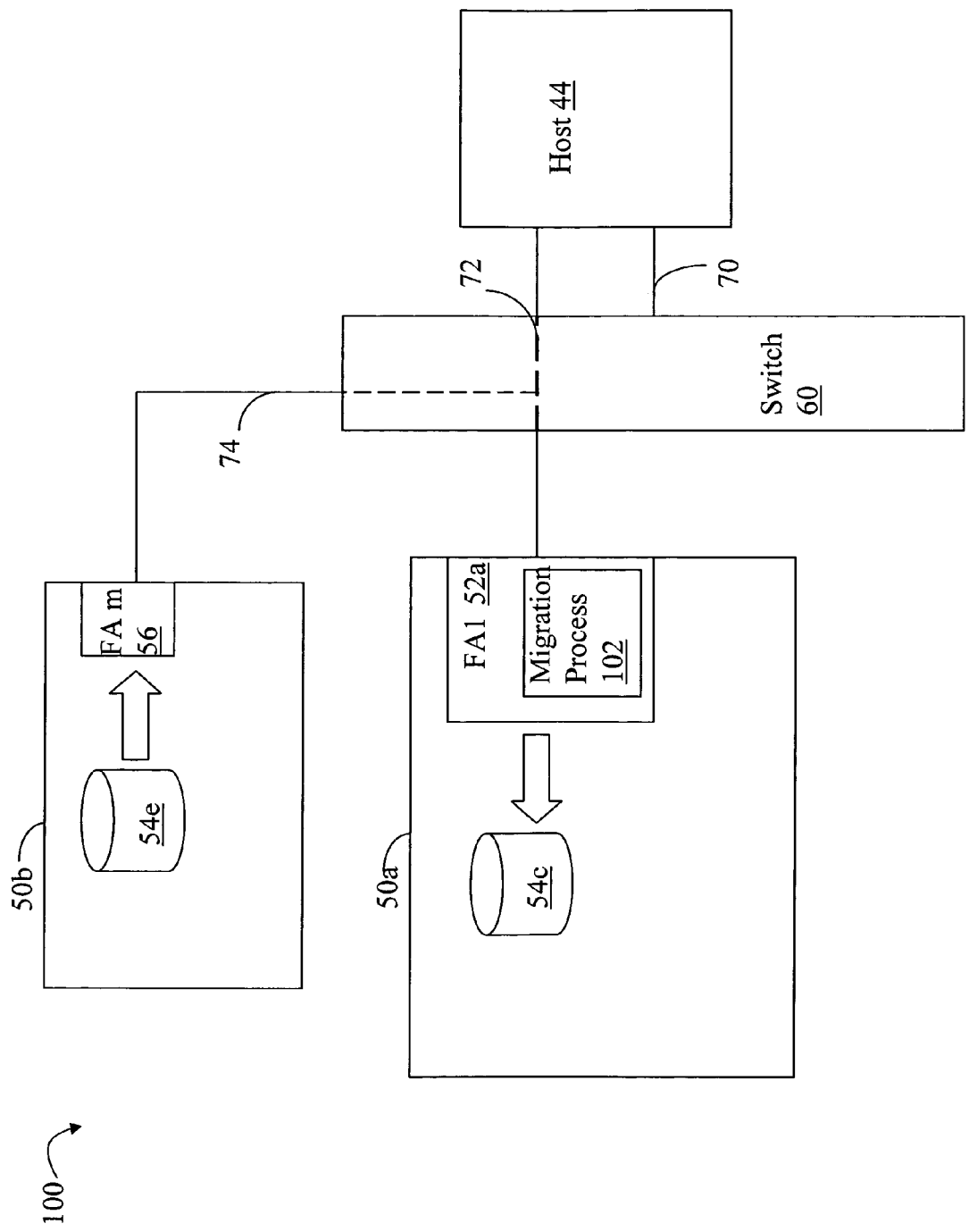
FIG. 4 is an example further illustrating the techniques from FIG. 3.

Referring now to FIG. 4, shown is an example further illustrating processing described in connection with FIG. 3 using the data pull technique. In the example 100, portions of the system 50a have been omitted for sake of simplicity of illustration. Additionally, a migration process 102 is included in the FA1 52a for migrating data from 54e to 54c.

In connection with performing the copying or migrating of the data, the FA1 52a may execute code of the migration process 102 to perform the copying or migration of data from 54e to 54c. In one embodiment, data storage system 50b may be an old or previous data storage system which has been replaced by a new data storage system 50a. As such, one or more devices of the new data storage system may need to be initialized with data from the old or previous data storage system 50b. One or more migration sessions may be set up to perform this migration of data from 50b to 50a using the data pull techniques. Data may be pulled from 50b to 50a, for example, using a copy or migration technique with "on demand" processing so that data is migrated as needed in response to a host I/O operation such as may be issued by the host 44.

In connection with the previous data storage system 50b, there may have been one or more device reservations previously made by the host 44 for devices included in 50b. Device reservations, for example, as referenced in connection with the Small Computer Systems Interface (SCSI) standard, are used in storage devices for allowing only certain users or computers to execute commands to the devices. For example, a reservation may allow only certain users, also referred to as an initiator port or host, to read or write to a volume on a device on a per path basis. In some cases, a host may be given exclusive permission to write to a volume while one or more other hosts may be given permission to read, but not write, to the volume. Subsequently, data storage system 50a may be connected to the host 44 and the migration processing on the data storage system 50a may be initiated to migrate the data from 50b to 50a using the data pull technique. At this point, a problem may occur in connection with performing the migration processing to pull the data from 50b to 50a due to the previously existing device reservations on 50b. The migration process 102 on 50a may be unable to read data from device 54e due to an existing device reservation previously or currently used by the host. As such, the migration process may fail because it cannot read from 54*e* due to the existing device reservation.

The techniques described in following paragraphs may be used in connection with overriding or penetrating the existing device reservation in order to allow the migration to proceed. In connection with commands used in illustrations herein, particular examples may be made with reference to SCSI-based commands. However, other embodiments may use other commands than as described herein.

In one embodiment that will be described in following paragraphs, processing may be performed in connection with discovery processing of the migration process 102. The discovery processing may be performed, for example, when the migration process 102 is initiated. Prior to beginning the migration of the data, the FA 1 52*a* may discover paths between each port of the FA1 52*a* and visible ports of one or more FAs on the remote data storage system 50*b*. As used herein, discover processing may be characterized as referring to the process of locating a specific remote device, opening a connection to the remote device, and determining whether the remote device is ready to accept data operations. The discovery process may be performed by executing code included in FA1 52*a* prior to the FA commencing copying of the data. Techniques that may be used in connection with performing discovery processing are described, for example, in U.S. patent application Ser. No. 11/014,597, TECHNIQUES FOR PERFORMING DISCOVERY PROCESSING, filed Dec. 16, 2004, which is incorporated by reference herein. Inputs to the migration processing may include one or more parameters specifying a source device and a target or destination device of the data migration. The parameters may also specify a particular path from the source and destination device to be used in connection with the data migration. In one embodiment using a fiber channel network to facilitate communications between data storage systems and hosts connected thereto, each of the LUNs may have an associated worldwide unique name or WWN. Each of the FAs may have one or more ports and each port may have its own unique WWN different from all other ports. Each LUN associated with a logical device has its own unique WWN. If two LUNs have the same WWN, they may be considered as mapping to the same device, such as, for example, the same LV. The source and destination devices, as well as any path to be used in the migration processing, may be specified using the WWNs. For example, inputs parameters for the migration session may be specified using an API (application programming interface). The parameters may include the WWN of the source device, the WWN of the target device, the WWN of the source port and the WWN of the target port. The WWNs of the source and target ports may specify the path to be used in connection with the migration process.

In connection with the data pull migration technique with reference to FIG. 4, the migration process 102 may perform discovery processing in accordance with the input parameters for the migration session. In this example, the migration process 102 may perform discovery processing to discover the WWN of device 54*e*, the source device, and the WWN of a port of FAm 56 included in 50*b*, the source port. The target device in this example is device 54*c* and the target port may be a port of the FA1 52*a*.

Figure 5:
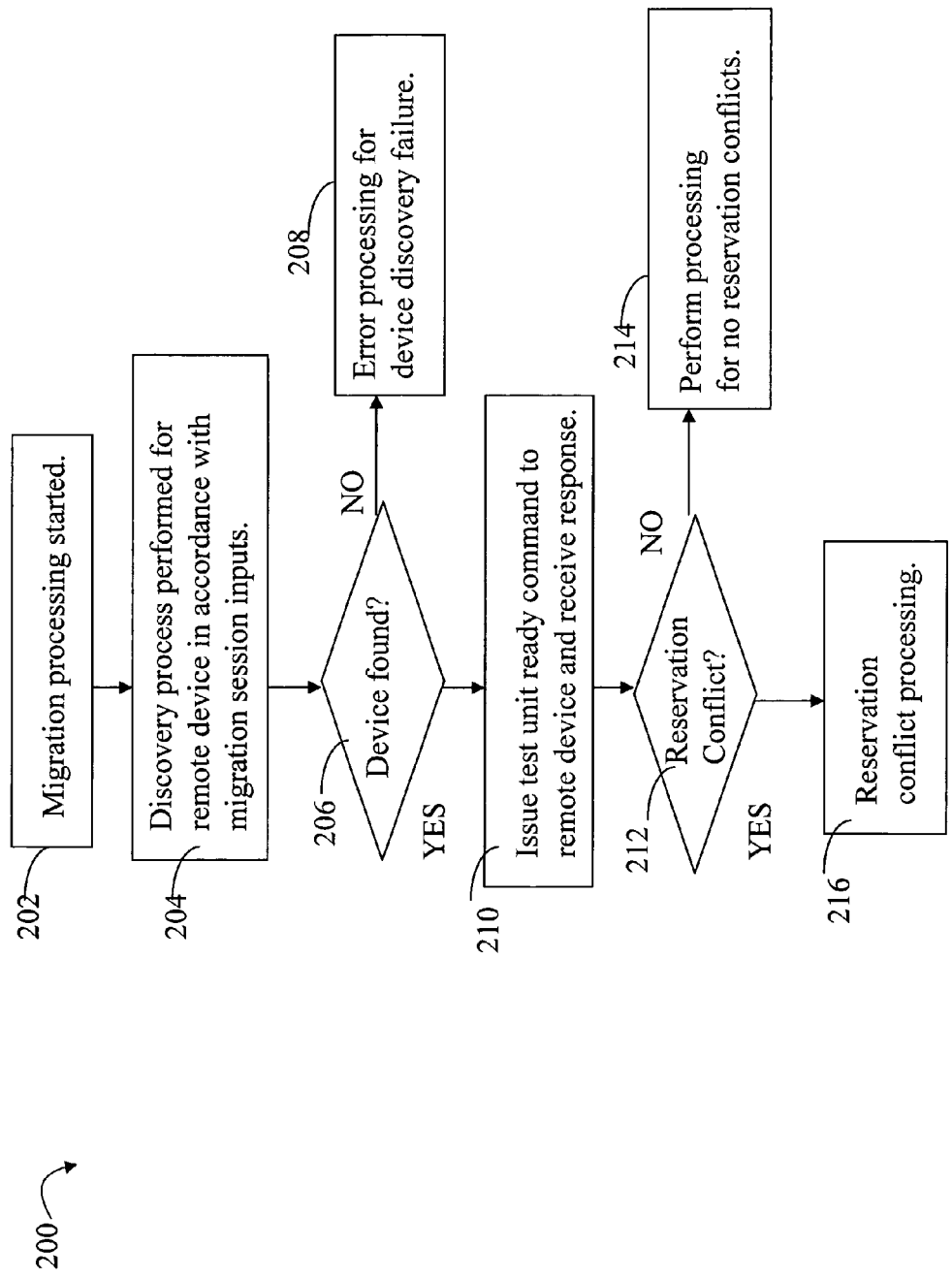
FIG. 5 is a flowchart of processing steps that may be performed in an embodiment in connection with migration processing using the techniques herein.

Referring now to FIG. 5, shown is a flowchart of processing steps that may be performed in an embodiment in connection with the techniques herein. At step 202, the migration processing may be started. As part of the migration process, discovery processing may be performed to discover the remote device and the remote port used in migrating the data. As described above, these may be specified as migration session input parameters. A WWN may be deemed discovered if, for example, a WWN of an input parameter is found to match the WWN of an actual entity in the network. In this example, a data pull technique is used so the remote device and remote port may be characterized as sources which are remote with respect to the migration process of the data storage system 50*a*. It should be noted that the remote port may be optional since specification of a path via the migration session inputs may be optional. At step 206, a determination is made as part of discovery processing as to whether the remote device and, optionally, the remote port if specified, are found. If step 206 evaluates to no, control proceeds to step 208 where error processing is performed for the discovery failure. It should be noted that occurrence of a failure during discovery processing may cause discovery processing to be performed again. An embodiment may perform up to a specified number of attempts at completing a successful discovery processing. In connection with particular failures or errors occurring during discovery processing as described at various points and processing steps herein such as at step 208, rediscovery may be automatically performed. Such an embodiment may also track the number of attempts to limit the number of times discovery processing is retried.

If step 206 evaluates to yes, control proceeds to step 210 where a test unit ready (TUR) command is issued to the data storage system 50*b* for the remote device 54*e* and a response is subsequently returned to the FA1 52*a*. The TUR command may be used to determine if the remote device, which in this example is the source device 54*e*, is ready for use in connection with the migration process. The response to the TUR command is returned to the system 50*a* and includes information as to whether the device 54*e* has any existing device reservations. A determination is made at step 212 as to whether a device reservation conflict for 54*e* exists. If not, control proceeds to step 214 to perform processing for no reservation conflicts. If step 212 evaluates to yes, control proceeds to step 216 to perform reservation conflict processing. Additional details in connection with steps 214 and 216 are described in following paragraphs.

Figure 6:
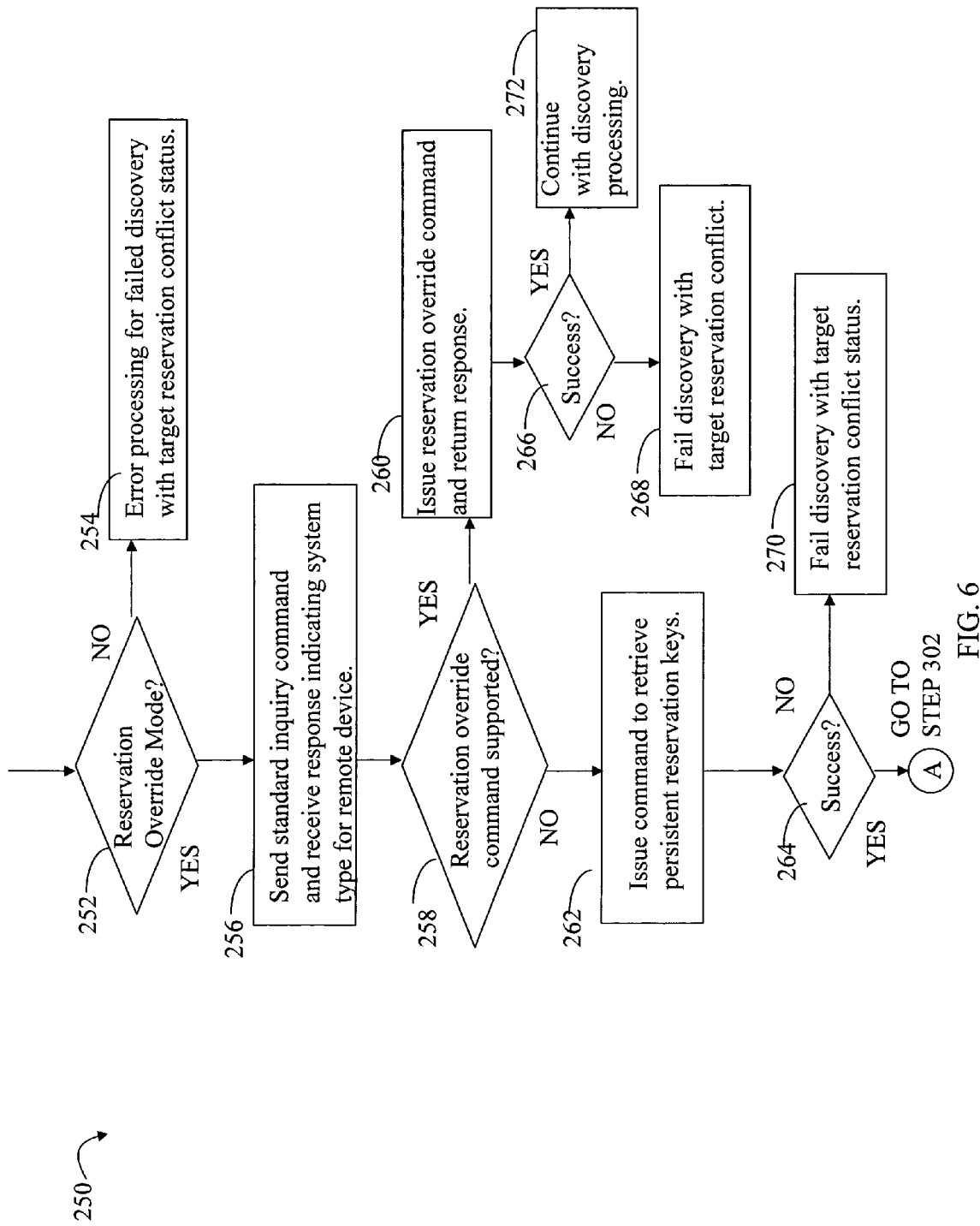
FIGS. 6 and 7 are flowcharts setting forth additional detail that may be performed in connection with reservation conflict processing from FIG. 5.
Figure 7:
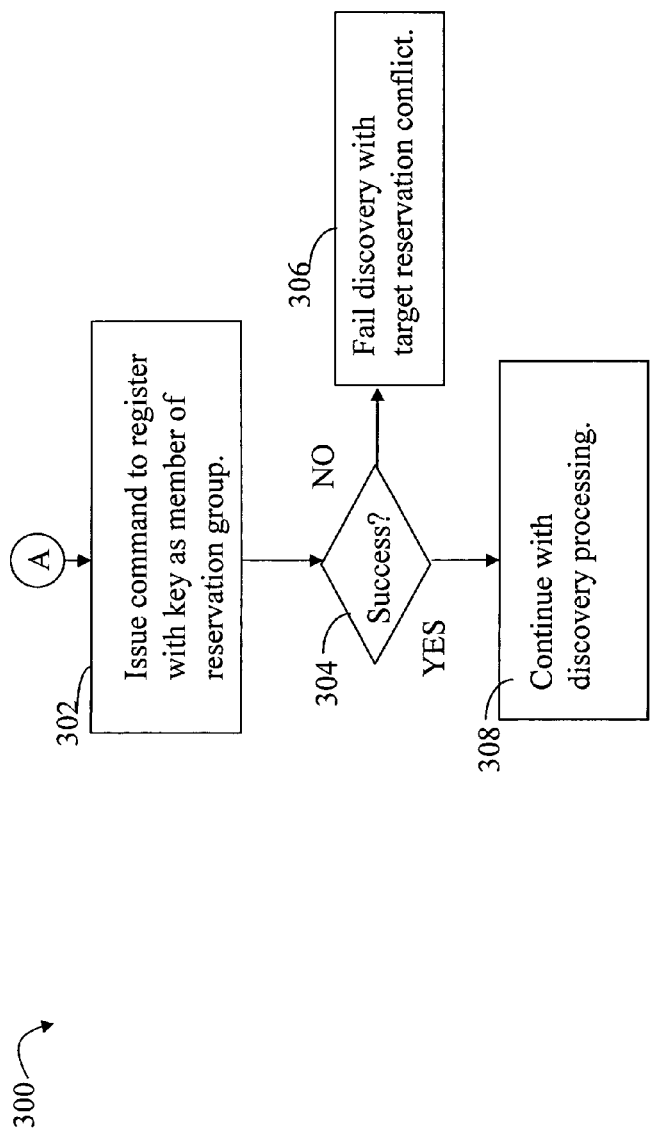

Referring now to FIGS. 6 and 7, shown are flowcharts of processing steps that may be performed in an embodiment when a reservation conflict is detected. These steps set forth more detailed processing of step 216 of FIG. 5 when the TUR command indicates a device reservation conflict. In one embodiment, a device reservation conflict may be determined to exist if the results returned in connection with the TUR command indicate that a single path has exclusive R (read) and W (write) access to the device. As described elsewhere herein, such a device reservation conflict may be determined, for example, due to an existing and possibly unused device reservation. What will now be described are processing steps in connection with a reservation override mode to override or penetrate the existing reservation so that the migration process may be able to access data from the device 54*e* of the data storage system 50*b*. An embodiment may include a reservation override mode indicator that may be implemented, for example, as a flag for enabling/disabling processing to override an existing reservation. If the reservation override mode is enabled, the reservation override processing may be performed. Otherwise, the reservation override processing may not be performed. The mode or flag setting may be specified, for example, as another input parameter to the migration process.

At step 252, a determination is made as to whether the reservation override mode is enabled or set. If not, control proceeds to step 254 to perform error processing for the failed discovery with the target reservation conflict status. If step 252 evaluates to yes, control proceeds to step 256 to perform reservation override processing. At step 256, an inquiry command is sent to data storage system 50*b* to inquire as to the type of data storage system. The results of the inquiry command are returned to the system 50*a*. The type of data storage system in this example may be used to indicate whether a particular command, such as a vendor specific reservation override command, is supported. If the command is supported, the data storage system may include code stored thereon which is executed to perform processing when the command is issued to the data storage system. Such processing may be performed, for example, in connection with step 260. In this example, issuing the reservation override command to the remote data storage system 50*b* causes code to be executed on the FA m 56 of the system 50*b* to override the existing device reservation as detected in step 212. The migration process 102 may perform processing, as indicated by step 258, to determine if the type of data storage system of 50*b* as indicated by the standard inquiry command is a type which supports the reservation override command. If so, control proceeds to step 260 where the FA 52*a* issues the reservation override command to the remote data storage system 50*b*. In one embodiment, the reservation override command may include a special code for the vendor-specific or proprietary reservation override command, and a unique process identifier. The unique identifier may be used to indicate a type of process, such as the migration process, for which the reservation override is to be performed with respect to a device, such as device 54. Rather than have the reservation override command include a path identifier as a parameter of the command data block, the path identifier may be implicitly specified based on the incoming path upon which the command is received. The path identifier may indicate the path used in connection with the migration process. The path identifier may include identifiers for each of the path endpoints, such as a port of FAm 56 of the system 50*b*, and a port of the FA1 52*a* of the system 50*a*. In accordance with the reservation override command, the data storage system 50*b* will allow subsequent data operations and commands for the device 54*e*, such as those in connection with reading data from device 54*e*, to proceed over the path indicated by the path identifier and when associated with a migration process. In connection with subsequently received data operations for the device, the path upon which a subsequently received data operation is received is compared to the path identifier of the reservation override command for the device. The data storage system allows the data operations received on the same path as indicated by the path identifier of the reservation override command to proceed. In other words, the device override is per device, and per path or connection.

The data storage system 50*b* may track reservation overrides for each device along with associated process identifiers in a data structure, such as a list. As part of processing performed for the reservation override command, step 260 may include processing to create an override or add the migration process identifier and associated path identifier to the list of reservation overrides as maintained by a receiving FA on the data storage system 50*b*. The list may also identify the one or more devices, such as device 54*e*, for which reservation override processing is performed in connection with subsequent data operations. Step 260 processing may also return, from data storage system 50*b* to 50*a*, a response indicating the status of the reservation override command.

A determination is made at step 266 as to whether the reservation override command, which creates the override entry for the migration process for reservation overrides with respect to device 54*e*, is successful. Such an indication may be determined by the system 50*a* in accordance with the response sent in step 260. If step 266 evaluates to yes, control proceeds to step 272 to continue with any remaining discovery processing. If step 262 evaluates to no, control proceeds to step 268 to fail discovery processing with a target reservation conflict status.

If step 258 evaluates to no, control proceeds to step 262 for processing in connection with remote data storage systems which do not support to reservation override command. At step 262, a command is issued from the system 50*a* to 50*b* to retrieve any persistent reservation keys from 50*b* indicating any current device reservations. In one embodiment, the command is issued to retrieve the persistent reservation keys for a single device. As known in the art, a key may indicate an identifier of a host or other entity for which a reservation has been made. Step 262 may result in returning any such reservation keys to the system 50*a*. A determination is made at step 264 as to whether the command to retrieve the device reservation keys has been successful. A determination at step 264 of failure may be made, for example, if there are no keys indicating no reservations, if there is a reservation type other than persistent causing the reservation conflict, or other error condition. If step 264 evaluates to no, control proceeds to step 270 to fail discovery processing with a target reservation conflict status. If step 264 evaluates to yes, control proceeds to step 302 where processing is performed to register or join an existing group reservation using one of the keys returned in step 262. Step 302 may include issuing a command from the system 50*a* to 50*b* to join or register with the group indicated by one of the keys. In this example using the data pull migration technique, the migration process may be migrating data from 50*b* to 50*a*. In one embodiment, a first key is used if there are multiple keys returned although an embodiment may use other techniques to select a key. In addition to specifying a key, the command may also include a path identifier for the path used in connection with the migration process. The path identifier may include identifiers for each of the path endpoints, such as a port of an FAm 56 of the system 50*b* and a port of the FA1 52*a* of the system 50*a*. Step 302 may return to the system 50*a* a response indicating a status of the command. A determination is made by the system 50*a* as to whether the command from step 302 to register as a member of the existing reservation group is successful. If not, control proceeds to step 306 to fail discovery processing with a target reservation conflict. If step 304 evaluates to yes, control proceeds to step 308 to continue with discovery processing.

The reservation override may be in effect for the duration of the migration process. When subsequent I/O operations are issued by the migration process, for example, to read data from the device 54*e*, the FA n 56 of the data storage system 50*a* may utilize the information in the reservation override list to allow an I/O operation for the migration process to proceed even though there may be an existing device reservation for device 54*e*. Once the migration session has ended, processing may be performed in an embodiment to terminate or clear out the reservation override. What will now be described in connection with FIGS. 8 and 9 are techniques that may be used to clear out a reservation override made in connection with step 260 processing.

Figure 8:
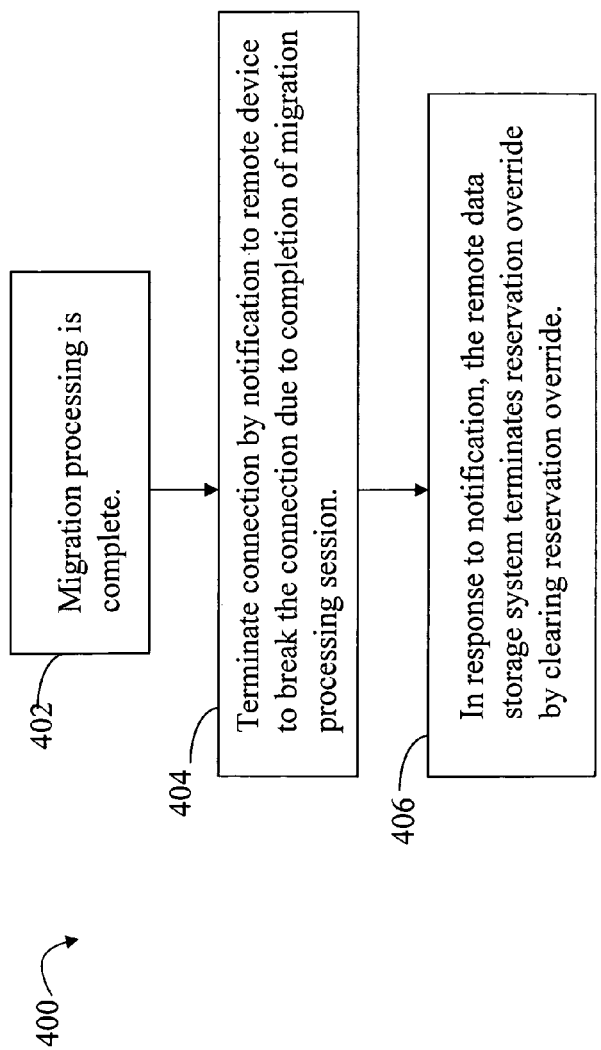

Referring now to FIG. 8, shown is a flowchart of processing steps that may be performed in an embodiment in connection with removing a reservation override. The flowchart 400 may be performed, for example, when migration processing of an existing session is complete as indicated at step 402. At step 404, in response to the migration session being terminated on 50*a*, the connection between the data storage systems 50*a* and

50b may be terminated or broken. With reference to FIG. 4, upon termination of the migration session on 50a, the system 50a may notify the switch 60 of the session termination. The switch 60 may in turn notify the system 50b of the migration session termination. At step 406, in response to the notification to system 50b, the remote data storage system 50b may clear out or terminate the reservation override associated with the migration process on the indicated path. Step 406 processing may include removing the reservation override, for example, from the list updated as part of step 260 processing. In other words, the path which just had a terminated session should match a path identifier of an entry in the reservation override list. As part of step 406 processing, this matching entry is removed.

Referring now to FIG. 9, shown is a flowchart of processing steps of another technique for terminating the reservation override for the migration process that may be performed in an embodiment. The steps of 450 may be performed without terminating the migration process or existing migration session as indicated in step 452. In step 452, the data copying phase of the migration session is complete but the migration session has not yet been terminated. At step 454, a command may be issued to the remote data storage system, such as the system 50b, from the system 50a to clear out the reservation override for the migration process. Such a command may include a code indicating the operation to be performed for clearing an existing reservation override in accordance with command parameters. The command parameters may include the migration process identifier and the path identifier. The migration process identifier and the path identifier may be used in connection with identifying an existing entry in the list of reservation overrides. In response to the command to clear out the reservation override, the remote data storage system may remove the entry from the list as indicated in step 456. Step 456 may also include returning to the system 50a a response with a status of the command operation performed in step 454.

It should be noted that if a first migration session is terminated but a first associated reservation override is not cleared, for example, using processing as described in connection with FIG. 9 or 9A, a subsequent second migration session using the same path or connection of the first migration session results in the first associated reservation override being cleared and possibly replaced with a new reservation override for the second migration session. In one embodiment as described herein, the path or connection associated with a migration session is a dedicated connection solely for the use of the migration process for the duration of the migration session.

In connection with an embodiment which does not support the reservation override command as described herein, processing may be performed to register or join an existing reservation group, for example, in step 302 of FIG. 7. Once the migration process is complete, processing may be performed to modify the group reservation removing the migration process. What will now be described in connection with FIG. 9A are processing steps that may be used to modify the group reservation removing the migration process previously added in step 302.

Figure 9A:
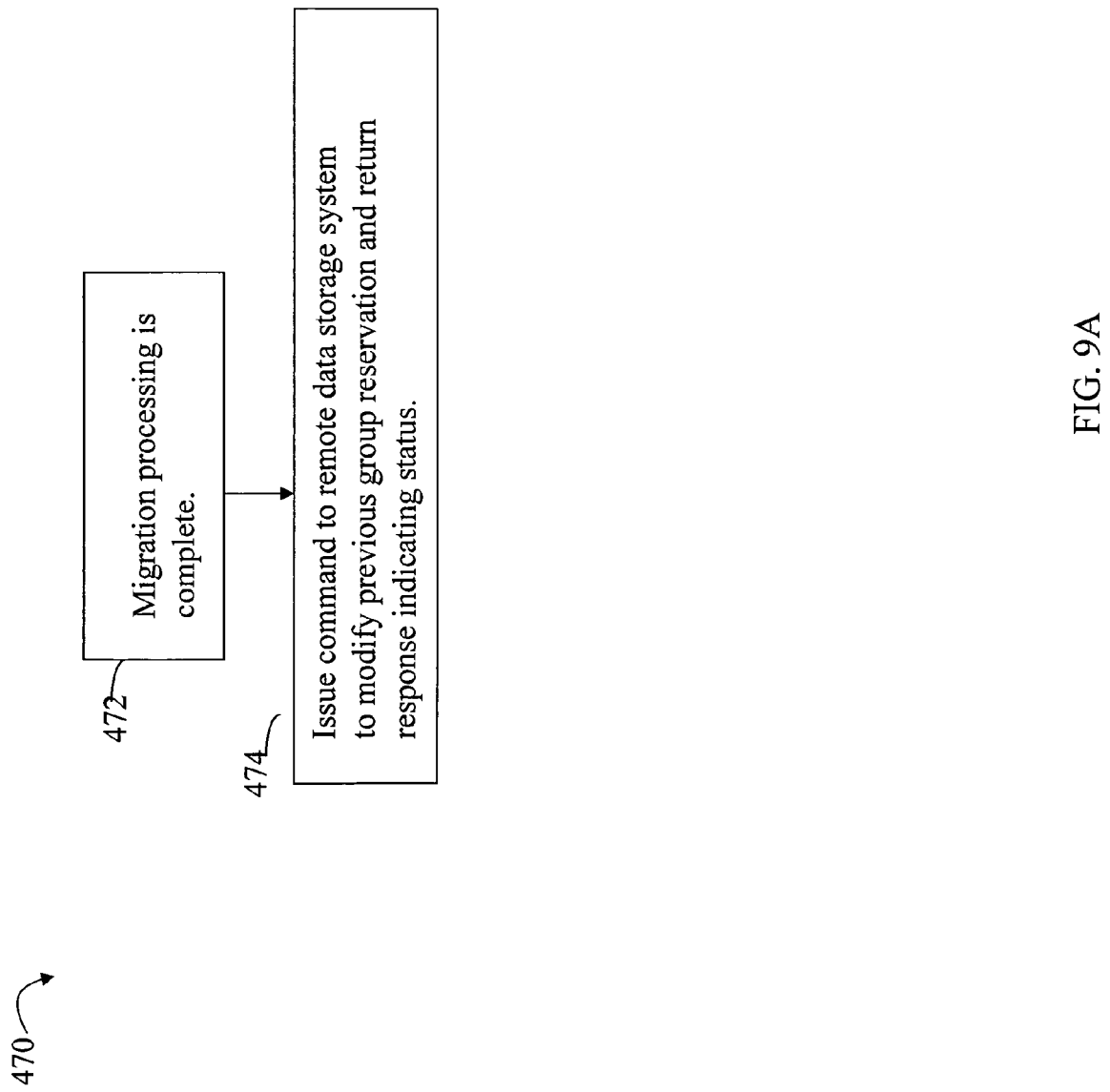
FIG. 9A is a flowchart of processing steps that may be performed in an embodiment to remove a group reservation.

Referring now to FIG. 9A, shown is a flowchart of processing steps that may be performed to modify a group reservation removing the migration process. At step 472, migration processing may be complete or otherwise terminated. At step 474, a command may be issued to the remote data storage system 50b from the system 50a to modify the group reservation removing the migration process. Step 474 may also return to the system 50a a response indicating the status of the command to modify the group reservation. The command in step 474 may include an appropriate command code, and the key and path identifier used previously in connection with processing of step 302 which added the migration process to the group.

Figure 10A:
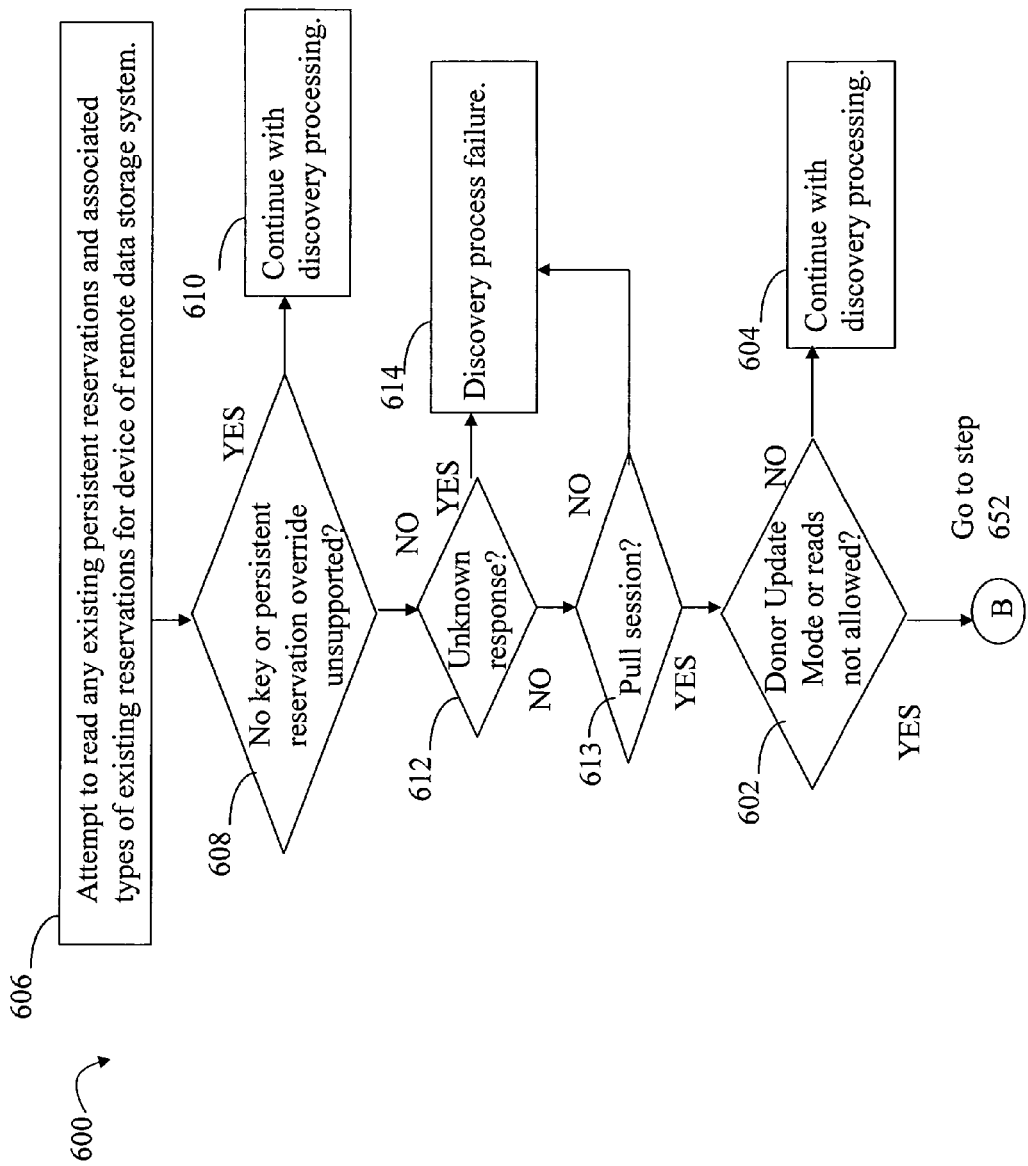
FIGS. 10A and 10B are flowcharts of processing steps setting forth additional detail that may be performed in an embodiment in connection with processing when no reservation conflicts are determined in FIG. 5.
Figure 10B:
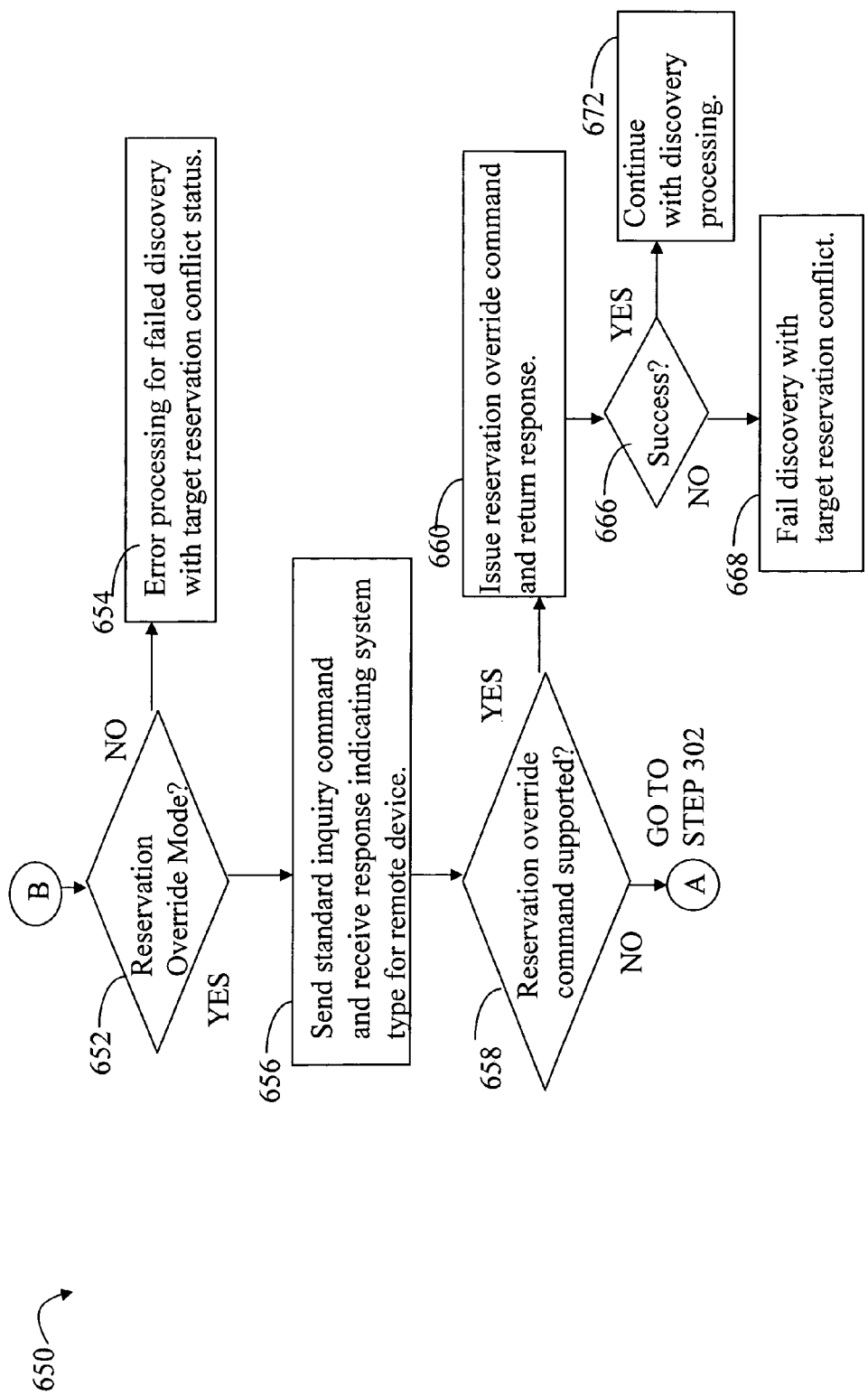

Referring now to FIG. 10A, shown is a flowchart of processing steps setting forth additional detail that may be performed in connection with processing when no reservation conflicts are determined in step 214 of FIG. 5. As described elsewhere herein, step 214 may be performed as a result of the TUR command indicating that no reservation conflict exists for the device 54e of the remote data storage system. In one embodiment, a mode referred to herein as donor update mode may be specified for a device in connection with the data pull operation. If donor update mode is enabled, in addition to pulling data from the source device of the remote data storage system in response to a host I/O for the data, the migration process also writes out any data updates due to the host I/O to the source device. In other words, the migration process first reads the data from the remote source device in response to a host I/O operation. If the host I/O operation modifies the data, the data is also written back to the remote source device so that the remote source device also reflects any data modifications. As a result, the remote source device includes a backup copy of the target device on the system 50b. In an embodiment including a donor update mode for a device, a flag or indicator may be specified to enable/disable donor update mode processing for a device. The donor update mode indicator may be included as an input parameter to the migration process. With reference to the illustration herein, the donor update mode indicator may be specified to enable/disable donor update mode processing with respect to the remote source device 54e on the data storage system 50b.

The flowchart 600 of FIG. 10A includes processing that may be performed in an embodiment which includes functionality for donor update mode. As will be appreciated by those skilled in the art, in an embodiment which does not include a donor update mode, any tests or processing in the flowchart 600 associated with donor update mode may be omitted.

In the flowchart 600 at step 606, an attempt is made to read any existing persistent reservations and associated types for these existing reservations. In other words, a command is issued to the system 50b as part of step 606 processing which returns one or more keys for any previously issued persistent reservations such as, for example, existing reservations made using a SCSI persistent reservation command. The types may include, for example, exclusive read and/or write access, as may be associated with an existing persistent reservation. In one embodiment, the command at step 606 performed with respect to a single requested device, such as device 54e. At step 608, a determination is made as to whether the command issued in step 606 has returned either no keys, or a return status indicating that the persistent reservation command is unsupported by the data storage system 50b. If step 608 evaluates to yes, control proceeds to step 610 to continue with any remaining discovery processing. It should be noted that a return status from the system 50b indicating an illegal request has been made in step 606 means that the system 50b does not support persistent reservations and therefore does not have any existing persistent reservations that may need to be overridden. If step 608 evaluates to no, control proceeds to step 612 where a determination is made as to whether the response received indicates an error or unknown status. If so, control proceeds to step 614 to perform processing for a discovery process failure. If step 612 evaluates to no, control proceeds to step 613 where a determination is made as to whether the discovery processing is performed in the context of a migration process or session. Step 613 may be characterized as making a determination to ensure that the techniques for overriding an existing reservation are only performed in connection with one or more selected processing operations. In this example, step 613 determines whether the discovery processing is being performed in connection with a pull migration session. An embodiment may perform the techniques described herein in connection with other operations, such as migration using a data push model as described elsewhere herein. In such instances, step 613 may also evaluate to yes the discovery process is being performed in connection with these one or more other operations. It should also be noted that step 613 may be performed in accordance with an optional setting allowing or disallowing reservation override processing in connection with one or more of these operations.

If step 613 evaluates to no, control proceeds to step 614. If step 613 evaluates to yes, control proceeds to step 602. A determination is performed at step 602 as to whether donor update mode is enabled (e.g., write access to the device is needed), or whether the reservation type associated with an existing reservation, as returned at step 606, indicates that read operations are not allowed by the data pull migration process in connection with subsequent data operations for the device of the remote data storage system. If step 602 evaluates to no, control proceeds to step 604 to continue with any remaining discovery processing. If step 604 evaluates to yes (e.g., write access to the device is needed, or read operations to the device are indicated as not allowed in connection with the migration process), control proceeds to step 652.

It should be noted that steps 652, 654, 656, 658, 660, 666, 668 and 672, respectively, perform processing similar to that as described elsewhere herein in connection with steps 252, 254, 256, 258, 260, 266, 268 and 272 of FIG. 6. If step 658 evaluates to no (e.g., reservation override command is not supported by 50*b*), control proceeds to step 302 for processing using one of the keys returned in step 606. As described elsewhere herein, if multiple keys are returned any one of a variety of different techniques may be used to select one of the keys. In one embodiment, the first key returned may be selected. As also described elsewhere herein, step 302 is included in the flowchart 300 of FIG. 7 where processing is performed to register as a member of an existing reservation group.

In connection with the foregoing exemplary embodiment, if a reservation conflict is determined at step 212 of FIG. 5, processing is performed in step 216 where an attempt is made to obtain read and write access independent of whether write access is actually needed for performing the migration processing (e.g., independent of whether donor update mode is enabled or not). As will be appreciated by those skilled in the art, an embodiment may also perform processing in connection with step 216 which attempts to obtain only the access type needed.

In connection with the foregoing, processing is described in which the reservation conflict is determined as part of discovery prior to beginning migration of the data. In an embodiment, discovery processing as described herein for detecting reservation conflicts may be performed after migration of the data has commenced. In other words, discovery processing associated with a migration session may be performed a first time successfully. Migration of the data may be performed. During the migration processing, an attempt to perform a data operation of the device 54*e* of system 50*b* may fail. This failure may be caused, for example, by a device reservation which has been added since the discovery processing complete successfully the first time. This failure may cause discovery processing to be performed a second time during which the reservation conflict is detected and processed.

Referring now to FIG. 11, shown is a flowchart of processing steps that may be performed in an embodiment in connection with detection of a reservation conflict causing a data operation failure during the migration process. The steps of flowchart 500 summarize processing just described. At step 502, discovery processing completes successfully a first time as part of migration processing. At step 504, data migration proceeds, for example, to pull data from the system 50*b* to 50*a* in response to receiving a host I/O operation for the data (e.g., on demand migration). At step 506, a device reservation is made for the remote device, such as 54*e* of the system 50*b*, which conflicts with data accesses performed by the migration process. At step 508, an attempt is made to perform a data operation as part of the migration processing accessing the remote device. At step 510, the data operation fails due to the reservation made at step 506. At step 512, discovery processing is performed a second time in response to the data operation failure of step 510. As part of step 512 processing, steps described in connection with FIG. 5 may be performed. In particular, the discovery processing described herein performed in step 512 includes performing step 214 to detect the device reservation conflict and step 216 for handling the detected conflict.

Figure 11A:
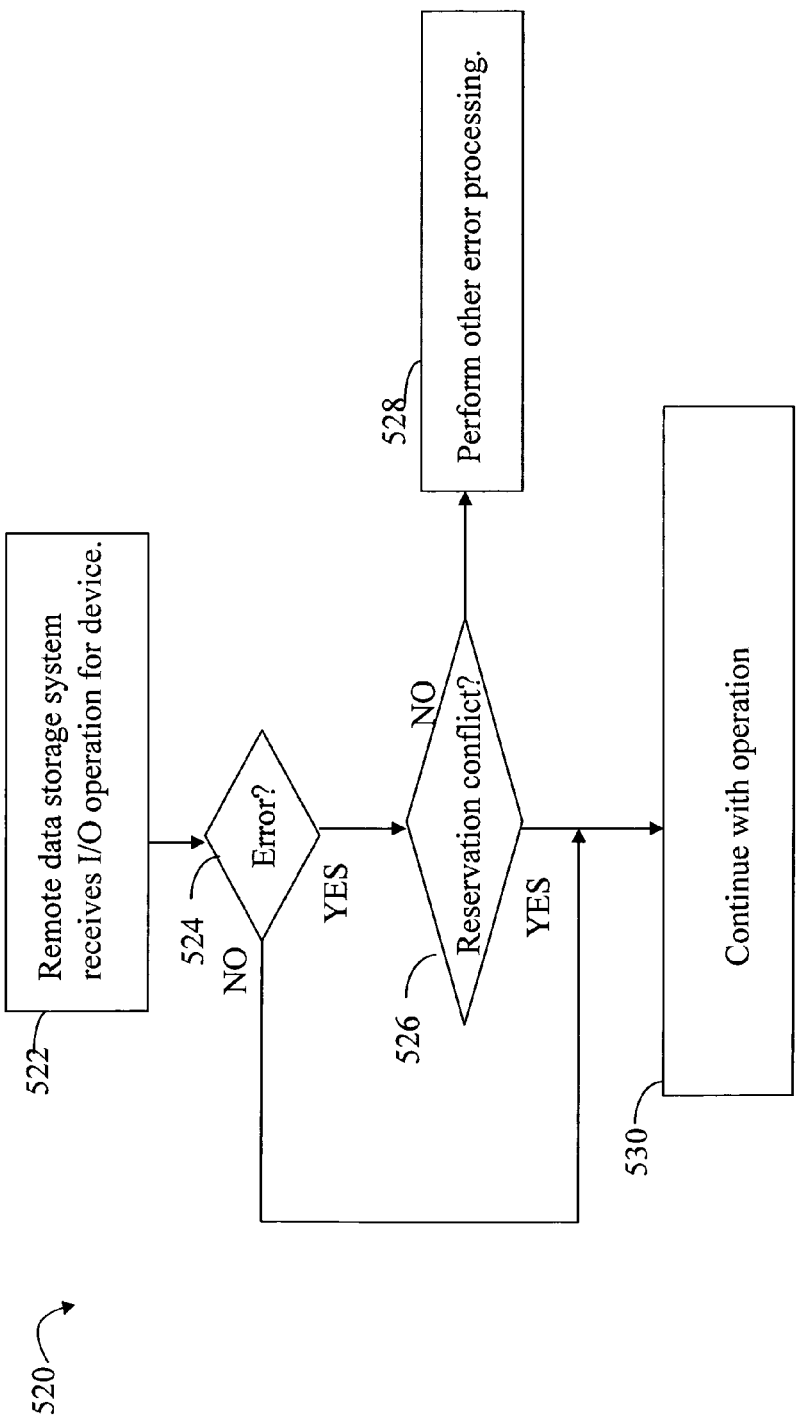
FIG. 11A is a flowchart of processing steps that may be performed in an embodiment in connection with processing an operation on a data storage system supporting the reservation override command.

Referring now to FIG. 11A, shown is a flowchart of processing steps that may be performed in an embodiment of a data storage system supporting the reservation override command. The steps of flowchart 520 may be performed in connection with overriding a device reservation when a subsequent I/O operation is received at the data storage system after the override has been created in the reservation override list, for example, as in connection with step 260. In one embodiment as described herein, implementation of the reservation override command may include performing additional processing steps at different points in time. A first set of additional processing steps may be performed in connection with initially entering or creating the override of the device reservation, for example, as part of the discovery processing when an entry is made in the reservation override list. As described herein, steps are performed on data storage system 50*b* in response to the command being received at the system 50*b*. A second set of additional processing steps may be performed by the data storage system 50*b* in connection with subsequently received I/O operations. At step 522, the remote data storage system, such as 50*b*, receives an I/O operation for a device. In connection with performing the I/O operation, the data storage system 524 may determine if an error has occurred. If so, control proceeds to step 526 to determine if the error was due to a device reservation conflict problem for a device having a corresponding entry in the reservation override list. Determining if an entry in the reservation override list corresponds to a received I/O operation may be determined, for example, by matching a path identifier from an entry to a path of the received I/O operation. If step 526 determines that the error was not due to a reservation conflict for a device having a corresponding entry in the reservation override list, control proceeds to step 528 to perform other error processing. Otherwise, control proceeds to step 530 where processing for the I/O operation continues. If step 524 determines that no error has occurred, control proceeds to step 530 to continue with the I/O operation.

In connection with the techniques and one of the embodiments described herein, a device reservation placed on a migration source device can prevent the data storage system 50a from migrating the data of the source device. In connection with enterprise clustered storage environments in which device reservations may be common, the techniques described herein may be used to allow the migration process to proceed and pull data from a migration source device which is reserved. In connection with the techniques described herein, the storage controller executing the migration process first performs discovery processing that creates a connection between migration source and target devices. In an existing implementation without the techniques described herein, if the discovery process detects a reservation on the remote device, such as a remote source device used in connection with migration processing, the migration processing is halted and discovery fails. Using the techniques herein, the discovery process on the target data storage system controlling the migration performs processing which allows the remote device reservation of the source device to be overridden. The reservation override processing may be optionally enabled when defining the migration session, such as using an input parameter flag as described herein. When a reservation is detected during the discovery on the data storage system controlling the migration processing, a proprietary command may be sent to the remote data storage system including the reserved device along with a predefined unique identifier identifying the migration process. The foregoing combination indicates to the remote data storage system that the initiator is a data storage system forming a connection for a migration. The remote data storage system then allows the data storage system controlling the migration to override the reservation of the migration source device for both read and write commands. When the data copying portion of the migration has been completed but prior to termination of the associated migration process or session, the data storage system controlling the migration may issue an explicit command to clear out or remove an existing reservation override associated with the migration process or session. The command to clear out the reservation is sent to the remote data storage system. In response, the remote data storage system may then perform processing to disable the override mechanism, such as by removing a corresponding entry from the reservation override list. Host resets during the migration will not reset the override mechanism. If a reservation is placed on the remote device, the migration source device in one embodiment herein, after the migration is initiated but before completion and the reservation override mechanism is enabled, the techniques described herein may be performed allowing the migration to complete.

As will be appreciated by those skilled in the art, the techniques for overriding or penetrating existing device reservations described herein may be applied in connection with other applications besides data pull migration. The techniques may be used, for example, in connection with a data push migration as well as others processing besides migration.

Figure 12A:
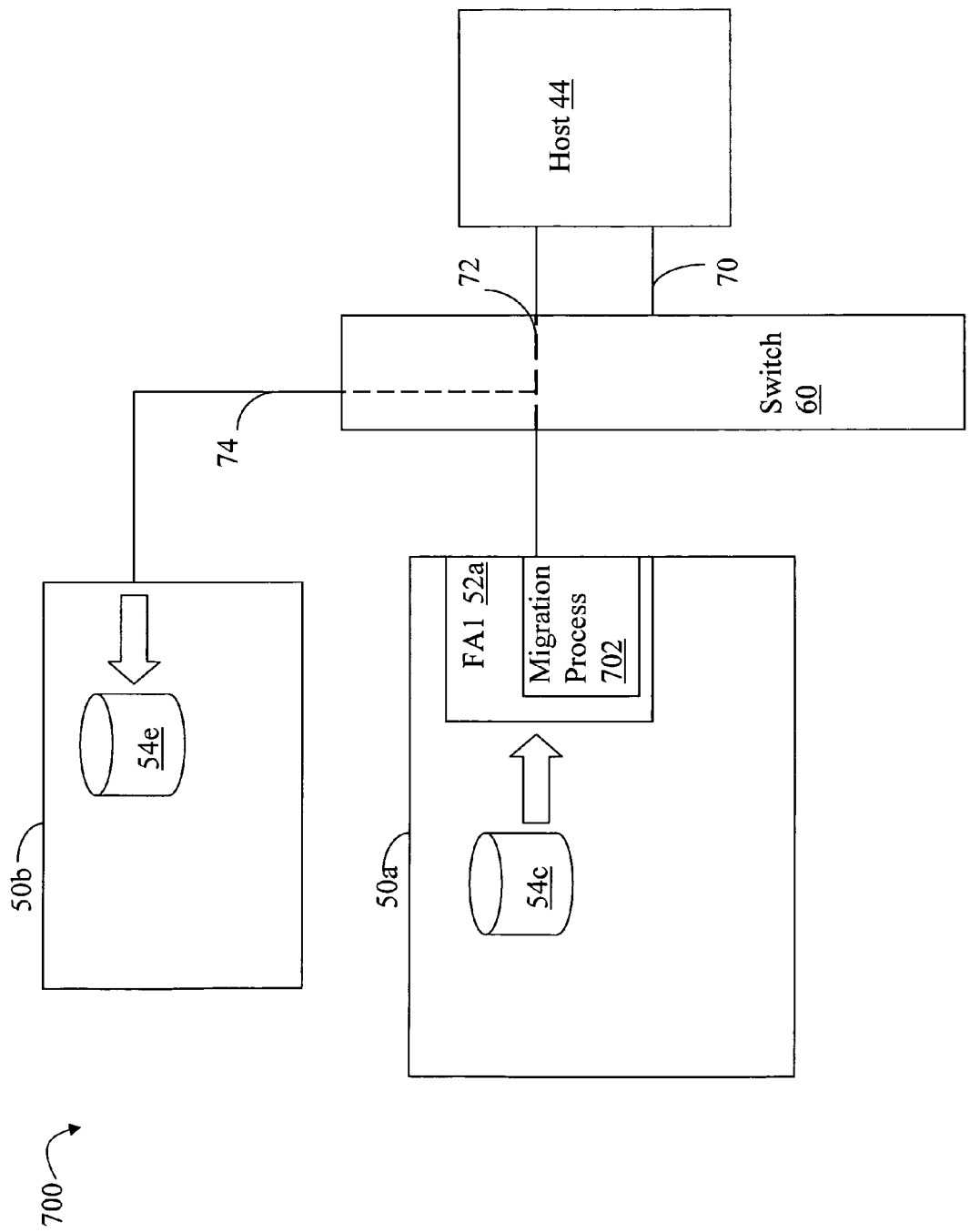
FIG. 12A is an example of an embodiment of a computer system that may utilize the techniques described herein with a data push migration session.

Referring now to FIG. 12A, shown is an example illustrating use of the technique herein in connection with a data push migration process. Components included in the example 700 are similarly numbered to others described herein in connection with other figures. The migration process 702 in this example may be performing a data push migration in which data is migrated by process 70 from device 54c to 54e. As such, the process 702 needs to have write access to the device 54e. In connection with utilizing a data push migration technique, it is moot to associate a donor update mode with the target device 54e. In such an embodiment, the migration process 702 may perform the steps described herein for use in connection with a data pull model omitting steps 602 and 604.

It should be noted that a data push operation may be performed with respect to multiple devices. For example, data may be copied from a source device to one or more target devices. In such an embodiment, the processing described herein with respect to a single device may be performed for each of the target devices. For example, processing described in connection with steps of FIG. 5 to discover a remote device is performed for each of the remote target devices. Additionally, in connection with an embodiment including a data push migration process, step 613 of FIG. 10A may include a test to determine whether the processing steps of flowchart 600 are being performed in connection with a data pull migration session or a data push migration session.

Figure 12B:
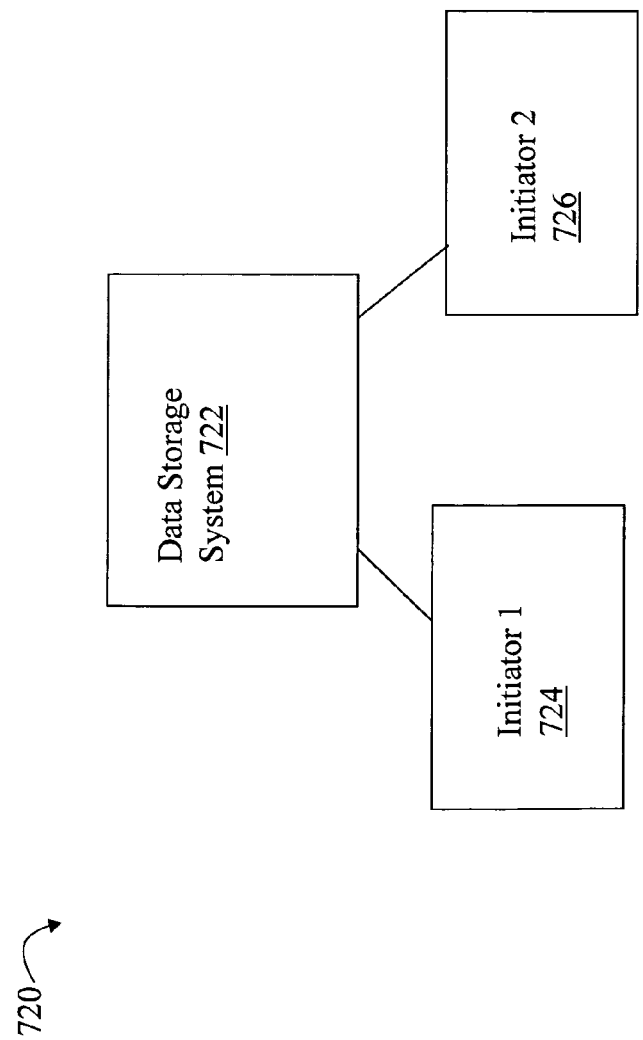
FIG. 12B is an example illustrating general applicability of the techniques herein for use in connection with components of a computer system.

The techniques described herein may also be used more generally as illustrated in FIG. 12B with respect to a device of a data storage system 722, a first initiator 724 and a second initiator 726. An initiator may be characterized as one that begins a transaction. In connection with the techniques described herein, an initiator may be, for example, a data storage system, a host, an appliance, switch, and the like. The techniques described herein may be useful for overriding or penetrating an existing reservation such as a first device reservation made by the first initiator 774 for a device of the system 722. The techniques described herein may be used to allow the second initiator 726 to override the first device reservation.

Figure 13:
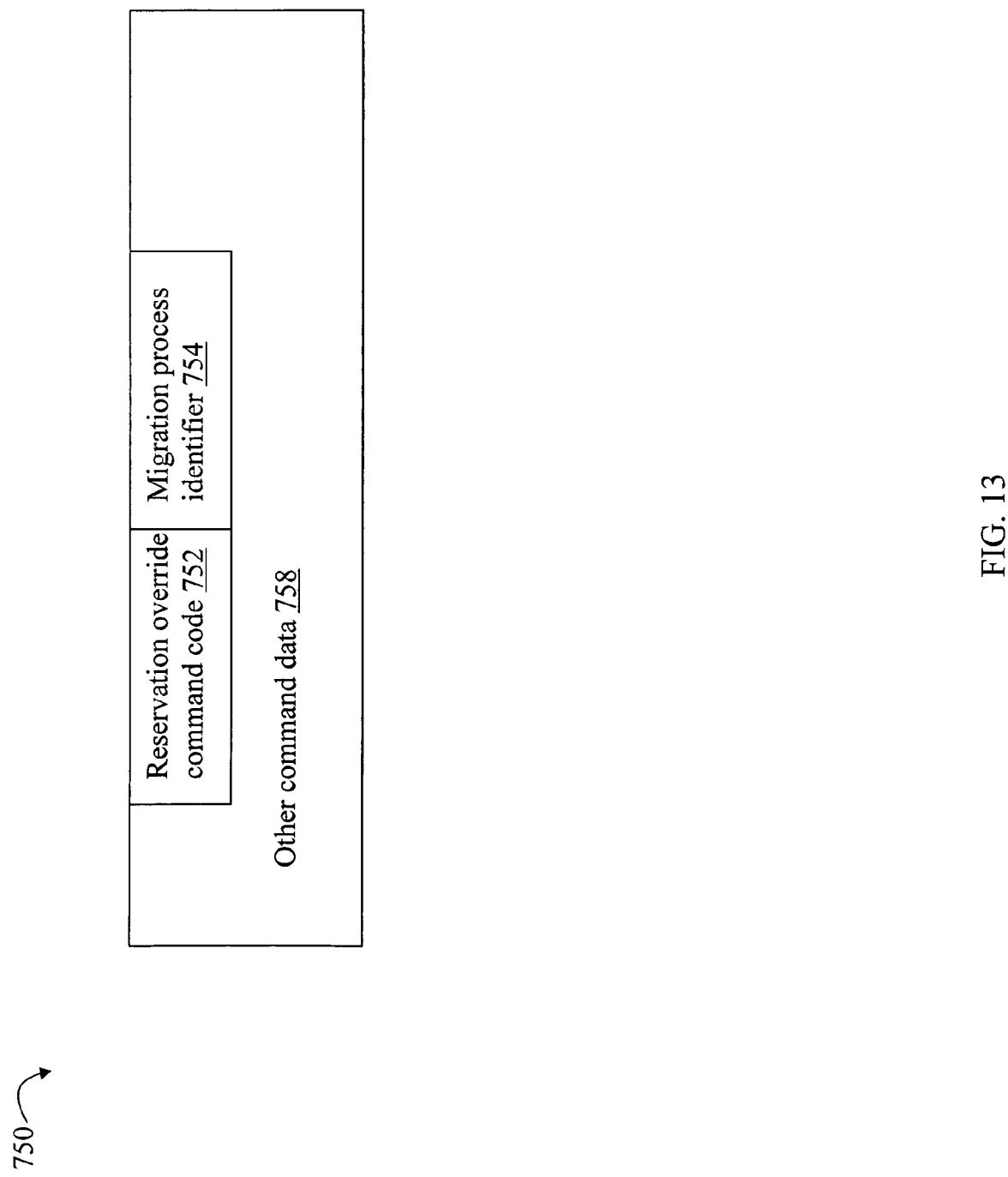
FIG. 13 is an example illustrating a layout of an embodiment of a reservation override command that may be used in connection with techniques described herein.

Referring now to FIG. 13, shown is an example 750 illustrating a layout of a reservation override command that may be used in an embodiment with the techniques herein. The example 750 may be associated with a layout for a command, for example, used in an implementation processing SCSI commands. The reservation override may be a vendor-specific or proprietary command having reservation override command code 752, a migration process identifier 754, and other command data 758. The code 752 may be an opcode indicating the reservation override command. The migration process identifier 754 may be a type identifier associated with migration processes. Other type identifiers may be associated with different processes utilizing the techniques herein.

Figure 14:
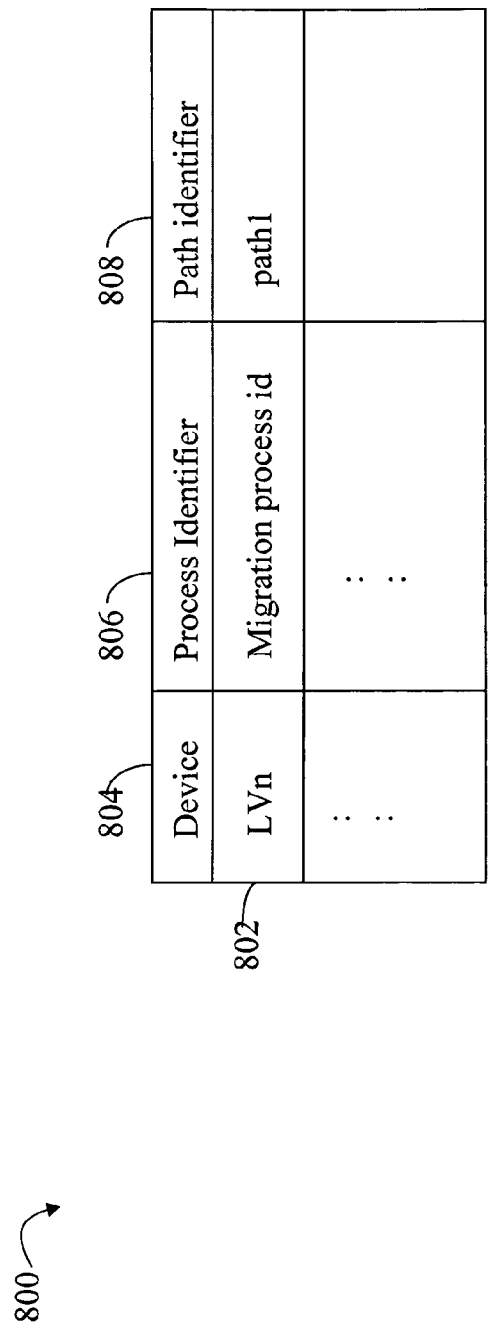
FIG. 14 is an example of an embodiment of the reservation override list that may be used in connection with the techniques herein.

Referring now to FIG. 14, shown is an example of an embodiment of a reservation override list. The example 800 may represent the list maintained, for example, by the FA 56 on the remote data storage system 50b from which data is migrated in connection with a data pull technique. The example 800 includes a row for each reservation override for a particular device. The example 800 includes data represented in tabular form having 3 columns of information: a first column 804 identifying the device for which the reservation override is defined, a second column 806 including the migration process identifier, and a third column 808 including the path identifier. An entry in the list 800 may be created, for example, with each reservation made for a device in connection with step 260 and step 660 processing. An entry may be removed from the list illustrated by 800, for example, when clearing a reservation override as in step 406 and step 456 processing.

It should be noted that although a donor update mode is described herein, as an alternative, a host may perform a dual write to also propagate updates to the source of a data pull operation. In an embodiment in which the host utilizes a dual write in connection with the data pull migration technique, the host may perform two explicit write operations—one to update the source device of the migration process and another to update the target of the migration process.

It should also be noted that although the use of the techniques described herein are performed as part of discovery processing, the techniques may also be performed in connection with other processing. For example, an embodiment may be performing a first process and issuing a data operation to a device. An error may occur in connection with the data operation. As part of the error processing without performing discovery processing, processing of steps 212, 214 and/or 216 may be performed. In other words, upon detection of the error, processing may be performed as described herein in which a TUR command is issued to determine whether there is a device reservation conflict as in step 212 of FIG. 5. Processing may continue with either step 214 or 216 in accordance with whether a reservation conflict is determined at step 212. As such, an embodiment may utilize the techniques herein without performing discovery processing. Rather, in such an embodiment, the techniques described herein may be included in an error handler or module which attempts to perform recovery processing taking corrective actions in response to the detected error. These and other embodiments will be appreciated by those skilled in the art.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for overriding an existing device reservation comprising:
   performing discovery processing by a first data storage system to locate a specified device, said discovery processing including determining whether there is a reservation conflict for said device of a second data storage system;
   if there is a reservation conflict for said device, issuing a command from the first data storage system to the second data storage system during said discovery processing to create an override for said reservation conflict, said override causing processing to be performed at a subsequent point in time so that an existing reservation associated with the reservation conflict is overridden in connection with performing a first process on said first data storage system, wherein override information for overriding said existing reservation of said device is stored in accordance with said command;
   receiving, at the second data storage system, a subsequent command for said device sent over an associated communication path; and
   determining whether to allow said subsequent command, said determining including determining whether said associated communication path is identified in the override information, wherein, the subsequent command is not allowed if the associated communication path is not accordingly identified in the override information.

2. The method of claim 1, wherein there is a reservation conflict for said device as determined during said discovery processing, and the method further comprising:
   receiving, by said second data storage system, a request from said first process executing on the first data storage system, said request including a data operation initiated by the first process to access data on the device; and
   performing, by said second data storage system, said data operation initiated by the first process for accessing data on the device, said data operation being performed in accordance with said override and causing an existing device reservation associated with said reservation conflict to be overridden.

3. The method of claim 1, wherein said discovery processing is performed prior to commencing processing for said first process.

4. The method of claim 3, wherein said first process is a migration process migrating data from said device of said second data storage system to another device of said first data storage system.

5. The method of claim 4, wherein said migration process only reads data from said device and copies said data to said other device.

6. The method of claim 5, wherein said migration process migrates a portion of data to said other device from said device in response to receiving a request at said first data storage system using said portion of data.

7. The method of claim 4, wherein said migration process:
   reads data from said device;
   copies said data to said other device in connection with a data operation;
   updates a copy of said data on said other device; and
   writes out an updated copy of the data to said device.

8. The method of claim 7, wherein writing out said updated copy of the data to the device is conditionally performed in accordance with a value of a parameter.

9. The method of claim 1, wherein said command is a proprietary command that includes an identifier uniquely identifying a type of process on the first data storage system.

10. The method of claim 1, wherein said discovery processing is performed after commencing processing for said first process in response to an error in connection with performing a data operation for said device.

11. The method of claim 1, further comprising:
   clearing, upon termination of said first process, an existing override which overrides said existing device reservation.

12. The method of claim 1, wherein said command is received over a first communication path and said override information for said device identifies said first communication path as a communication path over which subsequent commands for said device are allowed.

13. A method for overriding an existing device reservation comprising:
   performing discovery processing by a first data storage system to locate a specified device, said discovery processing including determining whether there is a reservation conflict for said device of a second data storage system;
   if there is a reservation conflict for said device, issuing a command from the first data storage system to the second data storage system during said discovery processing to create an override for said reservation conflict, said override causing processing to be performed at a subsequent point in time so that an existing reservation associated with the reservation conflict is overridden in connection with performing a first process on said first data storage system;
   issuing an inquiry command to the second data storage system to determine a type of said second data storage system;
   determining, in accordance with said type of the second data storage system, whether said second data storage system supports reservation override processing; and
   only issuing said command to create an override if said second data storage system supports reservation override processing.

14. The method of claim 13, wherein, if the second data storage system does not support reservation override processing, the method further comprising:

performing processing to join an existing device reservation group for said device.

15. A method for overriding an existing device reservation comprising:

performing discovery processing by a first data storage system to locate a specified device, said discovery processing including determining whether there is a reservation conflict for said device of a second data storage system; and if there is a reservation conflict for said device, issuing a command from the first data storage system to the second data storage system during said discovery processing to create an override for said reservation conflict, said override causing processing to be performed at a subsequent point in time so that an existing reservation associated with the reservation conflict is overridden in connection with performing a first process on said first data storage system, wherein said issuing a command from the first data storage system to the second data storage system to create an override for said reservation conflict by said first data storage system in connection with performing a first process is conditionally performed in accordance with a value of a parameter.

16. A method for overriding an existing device reservation comprising:

performing discovery processing by a first data storage system to locate a specified device, said discovery processing including determining whether there is a reservation conflict for said device of a second data storage system;

if there is a reservation conflict for said device, issuing a command from the first data storage system to the second data storage system during said discovery processing to create an override for said reservation conflict, said override causing processing to be performed at a subsequent point in time so that an existing reservation associated with the reservation conflict is overridden in connection with performing a first process on said first data storage system;

performing said discovery processing a first time in which no reservation conflicts for said device are determined;

performing processing for said first process, said processing including performing a data operation for said device;

determining an error in connection with performing said data operation; and performing said discovery processing a second time in which a reservation conflict for said device is determined.

17. A method for overriding an existing device reservation comprising:

determining, by a first initiator, whether there is a reservation conflict for a device of a remote data storage system;

if there is a reservation conflict for said device, issuing a command by the first initiator to the remote data storage system to create an override for said reservation conflict, said command being issued by said first initiator on a path from said initiator to said remote data storage system, said override allowing said initiator to proceed with subsequent data operations to said device sent using said path from said initiator to said remote data storage system, wherein override information for overriding an existing reservation of said device is stored in accordance with said command;

receiving, at the remote data storage system, a subsequent command for said device sent over an associated communication path; and determining whether to allow said subsequent command, said determining including determining whether said associated communication path is identified in the override information, wherein, the subsequent command is not allowed if the associated communication path is not accordingly identified in the override information.

18. The method of claim 17, the method further comprising:

detecting an error when performing processing by said initiator in connection with an operation for said device, and wherein said determining and said issuing said command are performed in response to said detecting.

19. The method of claim 17, wherein said first initiator is one of a data storage system, a host, an appliance and a switch in a network.

20. A computer readable medium comprising code stored thereon for overriding an existing device reservation, the computer readable medium comprising code that:

determines, by a first initiator, whether there is a reservation conflict for a device of a remote data storage system;

if there is a reservation conflict for said device, issues a command by the first initiator to the remote data storage system to create an override for said reservation conflict, said command being issued by said first initiator on a path from said initiator to said remote data storage system, said override allowing said initiator to proceed with subsequent data operations to said device sent using said path from said initiator to said remote data storage system, wherein override information for overriding an existing reservation of said device is stored in accordance with said command;

receives at the remote data storage system, a subsequent command for said device sent over an associated communication path; and determines whether to allow said subsequent command, said code that determines including code that determines whether said associated communication path is identified in the override information, wherein, the subsequent command is not allowed if the associated communication path is not accordingly identified in the override information.

* * * * *